United States Patent
Nozaki et al.

(10) Patent No.: US 12,187,825 B2
(45) Date of Patent: Jan. 7, 2025

(54) POLAR GROUP-CONTAINING OLEFIN COPOLYMER

(71) Applicants: THE UNIVERSITY OF TOKYO, Tokyo (JP); JAPAN POLYCHEM CORPORATION, Tokyo (JP)

(72) Inventors: Kyoko Nozaki, Tokyo (JP); Xiaoming Wang, Tokyo (JP); Takao Tayano, Mie (JP)

(73) Assignees: THE UNIVERSITY OF TOKYO, Tokyo (JP); JAPAN POLYCHEM CORPORATION, Tokyo (JP)

( * ) Notice: Subject to any disclaimer, the term of this patent is extended or adjusted under 35 U.S.C. 154(b) by 553 days.

(21) Appl. No.: 17/613,289

(22) PCT Filed: May 27, 2020

(86) PCT No.: PCT/JP2020/020995
§ 371 (c)(1),
(2) Date: Nov. 22, 2021

(87) PCT Pub. No.: WO2020/241715
PCT Pub. Date: Dec. 3, 2020

(65) Prior Publication Data
US 2022/0220239 A1    Jul. 14, 2022

(30) Foreign Application Priority Data
May 27, 2019    (JP) .................. 2019-098854

(51) Int. Cl.
*C08F 216/36*    (2006.01)
*C08F 4/80*    (2006.01)

(52) U.S. Cl.
CPC ............. *C08F 216/36* (2013.01); *C08F 4/80* (2013.01)

(58) Field of Classification Search
CPC .................................................. C08F 216/36
See application file for complete search history.

(56) References Cited

U.S. PATENT DOCUMENTS

| 3,689,460 A | 9/1972 | Nozaki et al. |
| 3,694,412 A | 9/1972 | Nozaki et al. |
| 3,770,700 A * | 11/1973 | Salvatore ............. C12N 11/089 525/154 |

FOREIGN PATENT DOCUMENTS

| JP | 6309206 B2 | 4/2018 |
| WO | 2014/115895 A1 | 7/2014 |

OTHER PUBLICATIONS

ISR issued in International Patent Application No. PCT/JP2020/020995, Jul. 21, 2020, English translation.
(Continued)

*Primary Examiner* — Nicole M. Buie-Hatcher
(74) *Attorney, Agent, or Firm* — GREENBLUM & BERNSTEIN, P.L.C.

(57) ABSTRACT

To provide a novel polar group-containing olefin copolymer in which an enone structure is introduced into the main chain as a structural unit. A polar group-containing olefin copolymer comprising a structural unit (A) derived from one or more monomers selected from the group consisting of ethylene and an olefin containing 3 to 20 carbon atoms, and a structural unit (B) represented by the following general formula (I):

General Formula (I)

(Continued)

($R^x$ and $R^y$ in the general formula (I) are as described in the Description.)

8 Claims, 14 Drawing Sheets

(56) References Cited

OTHER PUBLICATIONS

IPRP issued in International Patent Application No. PCT/JP2020/020995, Nov. 16, 2021, English translation.
Xiaoming Wang et al., Synthesis of Polyethylene with In-Chain a,b-Unsaturated Ketone and Isolated Ketone Units: Pd-Catalyzed Ring-Opening Copolymerization of Cyclopropenone with Ethylene, Angew. Chem. Int. Ed. 2019, 58, pp. 12955-12859.
European search report issued with respect to European application No. 20815584.6, dated Jul. 6, 2022.
Office Action issued in CN Patent Application No. 202080038562.9, Nov. 15, 2022, translation.
Office Action issued in JP Patent Application No. 2020-092527, Nov. 21, 2023, translation.
Office Action issued in JP Patent Application No. 2020-092527, Apr. 2, 2024, translation.

* cited by examiner

R: Hydrogen atom or substituent

R: Alkoxy group

POLAR GROUP-CONTAINING OLEFIN COPOLYMER

TECHNICAL FIELD

The disclosure relates to a novel polar group-containing olefin copolymer. In particular, the disclosure relates to a novel polar group-containing olefin copolymer in which an enone structure is introduced into the main chain.

BACKGROUND ART

Recently, there is an increasing need for a polar group-containing olefin copolymer in which a polar group is introduced into polyolefin, and there are reports of various copolymer examples.

As the polar group-containing olefin copolymer, a copolymer in which a polar group is contained in a side chain is conventionally known. For example, there is a copolymer as shown in FIG. 16, which is obtained by copolymerization of ethylene and an acrylic acid ester or a vinyl ketone and in which a carbonyl group is contained in a side chain (for example, Patent Literature 1).

As the polar group-containing olefin copolymer in which a polar group is introduced into the main chain of polyolefin, there is a copolymer as shown in FIG. 17, which is obtained by copolymerization of α-olefin and carbon monoxide and in which a carbonyl group is contained in the main chain (for example, Patent Literatures 2 and 3).

CITATION LIST

Patent Literatures

Patent Literature 1: Japanese Patent No. 6309206
Patent Literature 2: U.S. Pat. No. 3,694,412
Patent Literature 3: U.S. Pat. No. 3,689,460

SUMMARY OF INVENTION

Technical Problem

However, the copolymer as described in Patent Literature 1, which is a conventional copolymer of a polar group-containing monomer and α-olefin, is a polymer that contains a functional group only in a side chain. Conventional copolymerization of a polar group-containing monomer and α-olefin cannot introduce a functional group into the main chain of the polymer chain.

Copolymerization of α-olefin and carbon monoxide as described in Patent Literatures 2 and 3 can introduce a carbonyl group into the main chain of the polymer chain. However, a functional group different from a carbonyl group cannot be introduced into the main chain of a polymer. The copolymerization of α-olefin and carbon monoxide cannot introduce an enone structure, which is an unsaturated bond structure forming the conjugated system of alkene and ketone, as a structural unit of the polymer chain.

An object of the present application is to provide a novel polar group-containing olefin copolymer in which, as a structural unit, an enone structure is introduced into the main chain of the polymer chain.

Solution to Problem

The polar group-containing olefin copolymer of the present disclosure is a polar group-containing olefin copolymer comprising a structural unit (A) derived from one or more monomers selected from the group consisting of ethylene and an olefin containing 3 to 20 carbon atoms, and a structural unit (B) represented by the following general formula (I):

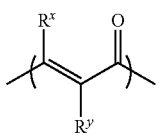

General Formula (I)

where $R^x$ and $R^y$ are each independently a hydrogen atom, a halogen atom, a hydroxyl group, a formyl group, an ester group containing 1 to 30 carbon atoms, an acyloxy group containing 1 to 30 carbon atoms, an acyl group containing 1 to 30 carbon atoms, an alkoxy group containing 1 to 30 carbon atoms, an aryloxy group containing 6 to 30 carbon atoms, an alkylthio group containing 1 to 30 carbon atoms, an arylthio group containing 6 to 30 carbon atoms, a nitro group, an amino group optionally being substituted with a hydrocarbon group containing 1 to 30 carbon atoms, a silyl group optionally being substituted with a hydrocarbon group containing 1 to 30 carbon atoms, an amide group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring.

In the polar group-containing olefin copolymer of the present disclosure, from the viewpoint of copolymer production efficiency, the structural unit (B) represented by the general formula (I) is preferably derived from one or more monomers selected from the group consisting of polar group-containing monomers represented by the following general formula (1):

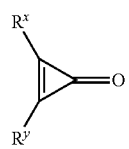

General Formula (1)

where $R^x$ and $R^y$ are each independently a hydrogen atom, a halogen atom, a hydroxyl group, a formyl group, an ester group containing 1 to 30 carbon atoms, an acyloxy group containing 1 to 30 carbon atoms, an acyl group containing 1 to 30 carbon atoms, an alkoxy group containing 1 to 30 carbon atoms, an aryloxy group containing 6 to 30 carbon atoms, an alkylthio group containing 1 to 30 carbon atoms, an arylthio group containing 6 to 30 carbon atoms, a nitro group, an amino group optionally being substituted with a hydrocarbon group containing 1 to 30 carbon atoms, a silyl group optionally being substituted with a hydrocarbon group containing 1 to 30 carbon atoms, an amide group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring.

In the polar group-containing olefin copolymer of the present disclosure, at least one of $R^x$ and $R^y$ is preferably different from a hydrogen atom, from the viewpoint of a wider range of applications of the polar group-containing olefin copolymer and from the viewpoint of the stability of the compound represented by the general formula (1).

The polar group-containing olefin copolymer of the present disclosure may further comprise a structural unit (C) derived from one or more monomers selected from the group consisting of a polar group-containing monomer (c-1) represented by the following general formula (2) and a polar group-containing monomer (c-2) represented by the following general formula (3):

General Formula (2)

where $R^1$ and $R^2$ are each independently a hydrogen atom, an ester group containing 1 to 30 carbon atoms, an acyloxy group containing 1 to 30 carbon atoms, an alkoxy group containing 1 to 30 carbon atoms, an aryloxy group containing 6 to 30 carbon atoms, a cyano group, an amino group optionally being substituted with a hydrocarbon group containing 1 to 30 carbon atoms, an amide group optionally being substituted with a hydrocarbon group containing 1 to 30 carbon atoms, an imino group optionally being substituted with a hydrocarbon group containing 1 to 30 carbon atoms, a halogen-substituted hydrocarbon group containing 1 to 30 carbon atoms, or a hydrocarbon group containing 1 to 30 carbon atoms and optionally being substituted with a functional group containing at least one selected from the group consisting of an oxygen atom, a sulfur atom, a nitrogen atom and a phosphorus atom, and at least one of $R^1$ and $R^2$ is a group containing at least one of an oxygen atom and a nitrogen atom, and General Formula (3)

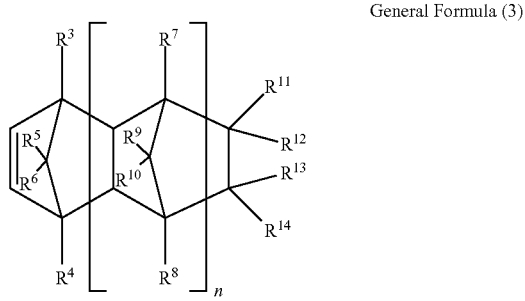

where $R^3$ to $R^{10}$ are each independently a hydrogen atom, a halogen atom or a hydrocarbon group containing 1 to 20 carbon atoms; n is 0 or a positive integer, and when n is 2 or more, $R^7$ to $R^{10}$ are each optionally the same or different in each repeating unit; $R^{11}$ to $R^{14}$ are each independently a hydrogen atom, an ester group containing 1 to 30 carbon atoms, an acyloxy group containing 1 to 30 carbon atoms, an alkoxy group containing 1 to 30 carbon atoms, an aryloxy group containing 6 to 30 carbon atoms, a cyano group, an amino group optionally being substituted with a hydrocarbon group containing 1 to 30 carbon atoms, an amide group optionally being substituted with a hydrocarbon group containing 1 to 30 carbon atoms, an imino group optionally being substituted with a hydrocarbon group containing 1 to 30 carbon atoms, or a hydrocarbon group containing 1 to 30 carbon atoms and optionally being substituted with a functional group containing at least one selected from the group consisting of an oxygen atom, a sulfur atom, a nitrogen atom and a phosphorus atom, and at least one of $R^{11}$ to $R^{14}$ is a group containing at least one of an oxygen atom and a nitrogen atom; and $R^{11}$ and $R^{12}$ are optionally integrated to form a divalent organic group, and $R^{13}$ and $R^{14}$ are optionally integrated to form a divalent organic group; $R^{11}$ or $R^{12}$ optionally forms a ring with $R^{13}$ or $R^{14}$.

In the polar group-containing olefin copolymer of the present disclosure, from the viewpoint of polymer production efficiency, the structural unit (A) is preferably a structural unit derived from ethylene.

In the polar group-containing olefin copolymer of the present disclosure, from the viewpoint of enhancing the applicability of the polar group-containing olefin copolymer and from the viewpoint of the stability of the compound represented by the general formula (1), it is preferable that $R^x$ and $R^y$ are each independently a hydrogen atom, a hydroxyl group, a formyl group, an ester group containing 1 to 30 carbon atoms, an acyl group containing 1 to 30 carbon atoms, an alkoxy group containing 1 to 30 carbon atoms, an amino group optionally being substituted with a hydrocarbon group containing 1 to 30 carbon atoms, a silyl group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring, and at least one of $R^x$ and $R^y$ is different from a hydrogen atom.

In the polar group-containing olefin copolymer of the present disclosure, from the viewpoint of enhancing the applicability of the polar group-containing olefin copolymer, it is preferable that $R^x$ and $R^y$ are each independently a halogen atom, a hydroxyl group, a formyl group, an ester group containing 1 to 30 carbon atoms, an acyloxy group containing 1 to 30 carbon atoms, an acyl group containing 1 to 30 carbon atoms, an alkoxy group containing 1 to 30 carbon atoms, an aryloxy group containing 6 to 30 carbon atoms, an alkylthio group containing 1 to 30 carbon atoms, an arylthio group containing 6 to 30 carbon atoms, an amino group optionally being substituted with a hydrocarbon group containing 1 to 30 carbon atoms, a silyl group optionally being substituted with a hydrocarbon group containing 1 to 30 carbon atoms, an amide group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring.

In the polar group-containing olefin copolymer of the present disclosure, from the viewpoint of enhancing the applicability of the polar group-containing olefin copolymer, it is preferable that $R^x$ and $R^y$ are each independently a hydroxyl group, a formyl group, an ester group containing 1 to 30 carbon atoms, an acyl group containing 1 to 30 carbon atoms, an alkoxy group containing 1 to 30 carbon atoms, an amino group optionally being substituted with a hydrocarbon group containing 1 to 30 carbon atoms, a silyl group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring.

Advantageous Effects of Invention

According to the present disclosure, a novel polar group-containing olefin copolymer in which, as a structural unit, an enone structure is introduced into the main chain of the polymer chain, can be provided.

BRIEF DESCRIPTION OF DRAWINGS

In the accompanying drawings.

DESCRIPTION OF EMBODIMENTS

Hereinafter, the polar group-containing olefin copolymer of the present disclosure is explained in detail. In the present Description, "(meth)acrylic acid" denotes "acrylic acid" or "methacrylic acid", and "(meth)acryloyl" denotes "acryloyl" or "methacryloyl". Also in the present Description, "to" which shows a numerical range is used to describe a range in which the numerical values described before and after "to" indicate the lower limit value and the upper limit value.

The polar group-containing olefin copolymer of the present disclosure is a polar group-containing olefin copolymer comprising a structural unit (A) derived from one or more monomers selected from the group consisting of ethylene and an olefin containing 3 to 20 carbon atoms, and a structural unit (B) represented by the following general formula (I):

General Formula (I)

where $R^x$ and $R^y$ are each independently a hydrogen atom, a halogen atom, a hydroxyl group, a formyl group, an ester group containing 1 to 30 carbon atoms, an acyloxy group containing 1 to 30 carbon atoms, an acyl group containing 1 to 30 carbon atoms, an alkoxy group containing 1 to 30 carbon atoms, an aryloxy group containing 6 to 30 carbon atoms, an alkylthio group containing 1 to 30 carbon atoms, an arylthio group containing 6 to 30 carbon atoms, a nitro group, an amino group optionally being substituted with a hydrocarbon group containing 1 to 30 carbon atoms, a silyl group optionally being substituted with a hydrocarbon group containing 1 to 30 carbon atoms, an amide group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring.

Figure 15:
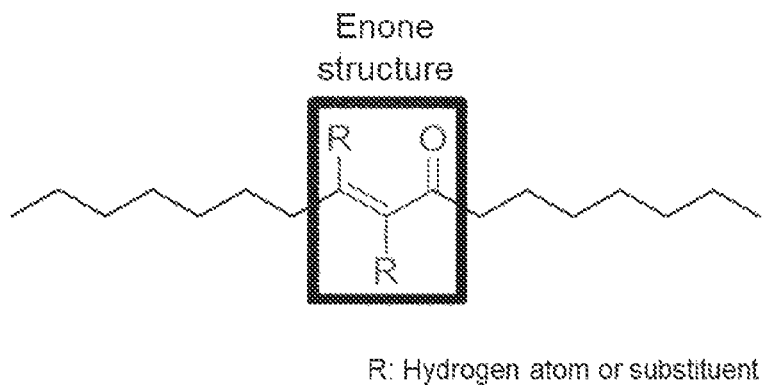
FIG. 15 is a schematic view of the structure of the polar group-containing olefin copolymer of the present disclosure.
Figure 16:
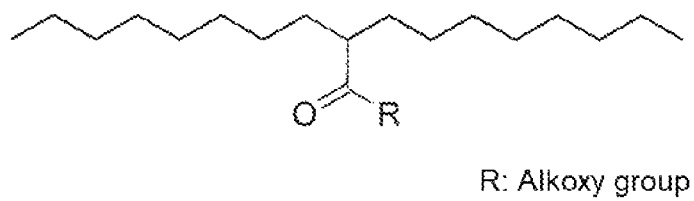
FIG. 16 is a schematic view of the structure of a conventional ethylene-acrylic acid ester copolymer.
Figure 17:
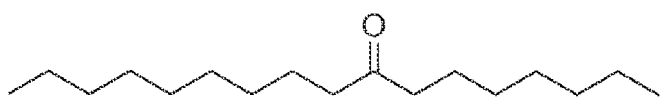
FIG. 17 is a schematic view of a conventional ethylene-carbon monoxide copolymer.

As shown in FIG. 15, the polar group-containing olefin copolymer of the present disclosure is a novel, multi-component polar group-containing olefin copolymer in which an enone structure, which is an unsaturated bond structure forming the conjugated system of alkene and ketone, is contained in the main chain of the polymer as the structural unit (B).

Since the enone structure has very high reactivity, the polar group-containing olefin copolymer of the present disclosure is usable as the substrate for reactions such as the Michael addition reaction and the Knoevenagel condensation reaction. Since the enone structure is known to show reactivity to anionic polymerization and radical polymerization, the polar group-containing olefin copolymer of the present disclosure is also usable as a polymerizable monomer.

In the polar group-containing olefin copolymer of the present disclosure, when a functional group different from a hydrogen atom is contained in the unsaturated bond of the enone structure, there is a possibility that the functional group functions as a leaving group. When the functional group functions as a leaving group, it can be the starting point for introducing a different substituent by using the polar group-containing olefin copolymer in the Heck reaction, the Wacker reaction, etc.

As described above, the polar group-containing olefin copolymer of the present disclosure is expected to be a raw material that can be transformed into various composite materials.

Also, the polar group-containing olefin copolymer of the present disclosure can contain two functional groups in the unsaturated bond of the enone structure, and it can contain three functional groups and one unsaturated bond always in the same sequence in the structural unit (B). Accordingly, for example, when $R^x$ and $R^y$ are groups containing a functional group having metal coordination properties, the polar group-containing olefin copolymer of the present disclosure is expected to function as a functional substance having chelate coordination properties with metal complexes, etc. Due to this function, the polar group-containing olefin copolymer of the present disclosure is also expected to be usable as a carrier for metal complex catalysts, an adsorbent for metal complex recovery, etc.

(1) Structural Unit (A)

The structural unit (A) is a structural unit derived from one or more monomers (A) selected from the group consisting of ethylene and an olefin containing 3 to 20 carbon atoms.

The monomer(s) (A) used in the present disclosure is at least one selected from the group consisting of ethylene and an olefin containing 3 to 20 carbon atoms. The olefin containing 3 to 20 carbon atoms may be a chain olefin or a cyclic olefin, and it may be at least one selected from the group consisting of an α-olefin containing 3 to 20 carbon atoms and a cyclic olefin containing 4 to 20 carbon atoms.

In the present disclosure, the α-olefin containing 3 to 20 carbon atoms is an α-olefin which contains 3 to 20 carbon atoms and which is represented by the following structural formula: $CH_2=CHR^{18}$ (where $R^{18}$ is a hydrocarbon group containing 1 to 18 carbon atoms and optionally having a straight or branched chain structure). The α-olefin containing 3 to 20 carbon atoms is more preferably an α-olefin containing 3 to 12 carbon atoms.

As the cyclic olefin containing 4 to 20 carbon atoms, examples include, but are not limited to, cyclobutene, cyclopentene, cyclohexene and norbornene.

As the monomer(s) (A), concrete examples include, but are not limited to, ethylene, propylene, 1-butene, 1-pentene, 1-hexene, 1-octene, 1-decene, 3-methyl-1-butene, 4-methyl-1-pentene and norbornene. From the viewpoint of polymer production efficiency, the monomer(s) (A) is preferably one or more selected from the group consisting of ethylene, propylene, 1-butene and norbornene, and it is more preferably ethylene.

The structural unit (A) may be one kind of structural unit, or it may be two or more kinds of structural units.

As the combination of two kinds of structural units, examples include, but are not limited to, structural units derived from ethylene-propylene, ethylene-1-butene, ethylene-1-hexene, ethylene-1-octene, propylene-1-butene, propylene-1-hexene, propylene-1-octene and ethylene-norbornene.

As the combination of three kinds of structural units, examples include, but are not limited to, structural units derived from ethylene-propylene-1-butene, ethylene-propylene-1-hexene, ethylene-propylene-1-octene, propylene-1-butene-hexene, and propylene-1-butene-1-octene.

In the present disclosure, the monomer(s) (A) used in the structural unit (A) preferably contains ethylene as an essential component. As needed, the monomer(s) (A) may further contain one or more kinds of α-olefins each of which contains 3 to 20 carbon atoms.

The ethylene in the monomer(s) (A) may be from 65 mol % to 100 mol %, or may be from 70 mol % to 100 mol %, for the total 100 mol % of the monomer(s) (A).

(2) Structural Unit (B)

The structural unit (B) is a structural unit represented by the following general formula (I):

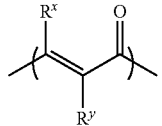

General Formula (I)

where $R^x$ and $R^y$ are each independently a hydrogen atom, a halogen atom, a hydroxyl group, a formyl group, an ester group containing 1 to 30 carbon atoms, an acyloxy group containing 1 to 30 carbon atoms, an acyl group containing 1 to 30 carbon atoms, an alkoxy group containing 1 to 30 carbon atoms, an aryloxy group containing 6 to 30 carbon atoms, an alkylthio group containing 1 to 30 carbon atoms, an arylthio group containing 6 to 30 carbon atoms, a nitro group, an amino group optionally being substituted with a hydrocarbon group containing 1 to 30 carbon atoms, a silyl group optionally being substituted with a hydrocarbon group containing 1 to 30 carbon atoms, an amide group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring.

As the halogen atom in the general formula (I), examples include a fluorine atom, a chlorine atom, a bromine atom and an iodine atom.

In the general formula (I), the ester group containing 1 to 30 carbon atoms is a monovalent group represented by —COOR$^a$ where R$^a$ is a hydrocarbon group containing 1 to 30 carbon atoms. The number of the carbon atoms of the ester group does not include the number of the carbon atoms of a carbonyl group, and it is the number of the carbon atoms of R$^a$. The lower limit may be 1 or more, or it may be 2 or more. The upper limit may be 30 or less, may be 20 or less, or may be 10 or less.

As the hydrocarbon group containing 1 to 30 carbon atoms as R$^a$, examples include, but are not limited to, a linear, branched or cyclic, saturated or unsaturated aliphatic hydrocarbon group, an aromatic hydrocarbon group, and combinations thereof. Preferred examples include, but are not limited to, an alkenyl group such as an ethenyl group, a propenyl group, a butenyl group and a pentenyl group; an aryl group such as a phenyl group, a methylphenyl group, an n-propylphenyl group, an i-propylphenyl group, an n-butylphenyl group, an i-butylphenyl group, an s-butylphenyl group, a t-butylphenyl group, an n-hexylphenyl group, a trimethylphenyl group, a pentamethylphenyl group, a biphenyl group, a naphthyl group, an anthracenyl group, a fluorenyl group and a tolyl group; an aralkyl group such as a benzyl group, a phenylethyl group, a phenylpropyl group, a naphthylmethyl group, a diphenylmethyl group and a triphenylmethyl group; and the following alkyl groups containing 1 to 30 carbon atoms.

The alkyl group containing 1 to 30 carbon atoms may be linear, branched or cyclic. As the alkyl group containing 1 to 30 carbon atoms, preferred examples include, but are not limited to, a methyl group, an ethyl group, a 1-propyl group, a 1-butyl group, a 1-pentyl group, a 1-hexyl group, a 1-heptyl group, a 1-octyl group, a 1-nonyl group, a 1-decyl group, a t-butyl group, a tricyclohexylmethyl group, an isopropyl group, a 1-dimethylpropyl group, a 1,1,2-trimethylpropyl group, a 1,1-diethylpropyl group, an isobutyl group, a 1,1-dimethylbutyl group, a 2-pentyl group, a 3-pentyl group, a 2-hexyl group, a 3-hexyl group, a 2-ethylhexyl group, a 2-heptyl group, a 3-heptyl group, a 4-heptyl group, a 2-propylheptyl group, a 2-octyl group, a 3-nonyl group, a cyclopropyl group, a cyclobutyl group, a cyclopentyl group, a methylcyclopentyl group, a cyclohexyl group, a methylcyclohexyl group, a cycloheptyl group, a cyclooctyl group, a cyclododecyl group, a 1-adamantyl group, a 2-adamantyl group and a norbornyl group.

The hydrocarbon group may further contain a substituent. As the substituent, examples include, but are not limited to, a halogen atom, an epoxy group, an amino group optionally being substituted with a hydrocarbon group containing 1 to 30 carbon atoms, an alkoxy group containing 1 to 30 carbon atoms, an aryloxy group containing 6 to 30 carbon atoms, and a hydroxyl group. The number of carbon atoms contained in the substituent is not included in the above-mentioned number of the carbon atoms.

The hydrocarbon group as R$^a$ is preferably a hydrocarbon group containing 1 to 8 carbon atoms, more preferably a hydrocarbon group containing 1 to 6 carbon atoms, and still more preferably an unsubstituted hydrocarbon group containing 1 to 6 carbon atoms.

As the ester group containing 1 to 30 carbon atoms, preferred examples include, but are not limited to, a methoxycarbonyl group, an ethoxycarbonyl group, an n-propoxycarbonyl group, an isopropoxycarbonyl group, an n-butoxycarbonyl group, a t-butoxycarbonyl group, a cyclohexyloxycarbonyl group, a 2-ethylhexyloxycarbonyl group, a benzyloxycarbonyl group and a phenoxycarbonyl group.

In the general formula (I), the acyloxy group containing 1 to 30 carbon atoms is a monovalent group represented by —OCOR$^b$ where R$^b$ is a hydrocarbon group containing 1 to 30 carbon atoms. The number of the carbon atoms of the acyloxy group does not include the number of the carbon atoms of a carbonyl group, and it is the number of the carbon atoms of R$^b$. The lower limit may be 1 or more, or it may be 2 or more. The upper limit may be 30 or less, may be 20 or less, or may be 10 or less.

As the hydrocarbon group containing 1 to 30 carbon atoms, examples include those exemplified above as R$^a$.

As the acyloxy group containing 1 to 30 carbon atoms, preferred examples include, but are not limited to, an acetyloxy group, a propionyloxy group, a (meth)acryloyloxy group and a benzoyloxy group.

In the general formula (I), the acyl group containing 1 to 30 carbon atoms is a monovalent group represented by —COR$^c$ where R$^c$ is a hydrocarbon group containing 1 to 30 carbon atoms. The number of the carbon atoms of the acyl group does not include the number of the carbon atoms of a carbonyl group, and it is the number of the carbon atoms of R$^c$. The lower limit may be 1 or more, or it may be 2 or more. The upper limit may be 30 or less, may be 20 or less, or may be 10 or less.

As the hydrocarbon group containing 1 to 30 carbon atoms as R$^c$, examples include those exemplified above as R$^a$.

As the acyl group containing 1 to 30 carbon atoms, preferred examples include, but are not limited to, an acetyl group, a propionyl group, a (meth)acryloyl group and a benzoyl group.

In the general formula (I), the alkoxy group containing 1 to 30 carbon atoms is a monovalent group represented by —OR$^d$ where R$^d$ is an alkyl group containing 1 to 30 carbon atoms or an aralkyl group containing 7 to 30 carbon atoms. For the number of the carbon atoms of the alkoxy group, the lower limit may be 1 or more, or it may be 2 or more. The upper limit may be 30 or less, may be 20 or less, or may be 10 or less.

As the alkyl group containing 1 to 30 carbon atoms and the aralkyl group containing 7 to 30 carbon atoms as R$^d$, examples include those exemplified above as R$^a$.

As the alkoxy group containing 1 to 30 carbon atoms, preferred examples include, but are not limited to, a methoxy group, an ethoxy group, an n-propoxy group, an i-propoxy group, an n-butoxy group, an i-butoxy group, an s-butoxy group, a t-butoxy group, an n-pentoxy group, an n-hexoxy group, a cyclopropoxy group, a cyclopentoxy group, a cyclohexyloxy group, an n-octyloxy group, an n-decyloxy group and a benzyloxy group.

The aryloxy group containing 6 to 30 carbon atoms is a monovalent group represented by —OR$^{d'}$ where R$^{d'}$ is an aryl group containing 6 to 30 carbon atoms. For the number of the carbon atoms of the aryl group, the lower limit may be 6 or more, or it may be 8 or more. The upper limit may be 30 or less, may be 20 or less, or may be 12 or less.

As the aryl group containing 6 to 30 carbon atoms as R$^{d'}$, examples include those corresponding to the aryl group containing 6 to 30 carbon atoms among the examples mentioned above as R$^a$.

As the aryloxy group containing 6 to 30 carbon atoms, concrete examples include, but are not limited to, a phenoxy group, a methylphenoxy group, an ethylphenoxy group, a butylphenoxy group, a naphthyloxy group, a fluorenyloxy group and an anthracenyloxy group.

In the general formula (I), the alkylthio group containing 1 to 30 carbon atoms is a monovalent group represented by —SR$^e$ where R$^e$ is an alkyl group containing 1 to 30 carbon atoms or an aralkyl group containing 7 to 30 carbon atoms. For the number of the carbon atoms of the alkylthio group, the lower limit may be 1 or more, or it may be 2 or more. The upper limit may be 30 or less, may be 20 or less, or may be 10 or less.

As the alkyl group containing 1 to 30 carbon atoms and the aralkyl group containing 7 to 30 carbon atoms as R$^e$, examples include those exemplified above as R$^a$.

As the alkylthio group containing 1 to 30 carbon atoms, preferred examples include, but are not limited to, a methylthio group, an ethylthio and a benzylthio group.

The arylthio group containing 6 to 30 carbon atoms is a monovalent group represented by —SR$^{e'}$ where R$^{e'}$ is an aryl group containing 6 to 30 carbon atoms. For the number of the carbon atoms of the aryl group, the lower limit may be 6 or more, or it may be 8 or more. The upper limit may be 30 or less, may be 20 or less, or may be 12 or less.

As the aryl group containing 6 to 30 carbon atoms as R$^{e'}$, examples include those corresponding to the aryl group containing 6 to 30 carbon atoms among the examples mentioned above as R$^a$.

As the arylthio group containing 6 to 30 carbon atoms, concrete examples include, but are not limited to, a phenylthio group and a naphthylthio group.

In the general formula (I), the amino group optionally being substituted with a hydrocarbon group containing 1 to 30 carbon atoms, is a monovalent group represented by —N(R$^f$)R$^g$ where R$^f$ and R$^g$ are each independently a hydrogen atom or a hydrocarbon group containing 1 to 30 carbon atoms. For the number of the carbon atoms of the hydrocarbon group substituted to the substituted amino group, the lower limit may be 1 or more, or it may be 2 or more. The upper limit may be 30 or less, may be 20 or less, or may be 10 or less.

As the hydrocarbon group containing 1 to 30 carbon atoms as R$^f$ and R$^g$, examples include those exemplified above as R$^a$.

As the amino group optionally being substituted with a hydrocarbon group containing 1 to 30 carbon atoms, preferred examples include, but are not limited to, an amino group (—NH$_2$), a monomethylamino group, a dimethylamino group, a monoethylamino group, a diethylamino group, a monoisopropylamino group, a diisopropylamino group, a monophenylamino group and a diphenylamino group.

In the general formula (I), the silyl group optionally being substituted with a hydrocarbon group containing 1 to 30 carbon atoms, is a monovalent group represented by —SiR$^h$R$^i$R$^j$ where R$^h$, R$^i$ and R$^j$ are each independently a hydrogen atom or a hydrocarbon group containing 1 to 30 carbon atoms. For the number of the carbon atoms of the hydrocarbon group substituted to the silyl group, the lower limit may be 1 or more, or it may be 2 or more. The upper limit may be 30 or less, may be 20 or less, or may be 10 or less.

As the hydrocarbon group containing 1 to 30 carbon atoms as R$^h$, R$^i$ and R$^j$, examples include those exemplified above as R$^a$.

As the silyl group optionally being substituted with a hydrocarbon group containing 1 to 30 carbon atoms, preferred examples include, but are not limited to, a trimethylsilyl group, a triethylsilyl group, a tert-butyldimethylsilyl group, a triisopropylsilyl group and a tert-butyldiphenylsilyl group.

In the general formula (I), the amide group optionally being substituted with a hydrocarbon group containing 1 to 30 carbon atoms is a monovalent group represented by —CONR$^k$R$^l$ or —NR$^k$COR$^l$ where R$^k$ and R$^l$ are each independently a hydrogen atom or a hydrocarbon group containing 1 to 30 carbon atoms. The number of the carbon atoms of the hydrocarbon group substituted to the substituted amide group, does not include the number of the carbon atoms of a carbonyl group, and it is the number of the carbon atoms of R$^k$ and R$^l$. The lower limit may be 1 or more, or it may be 2 or more. The upper limit may be 30 or less, may be 20 or less, or may be 10 or less.

As the hydrocarbon group containing 1 to 30 carbon atoms as R$^k$ and R$^l$, examples include those exemplified above as R$^a$.

As the amide group optionally being substituted with a hydrocarbon group containing 1 to 30 carbon atoms, preferred examples include, but are not limited to, —CONH$_2$, —CONH(CH$_3$), —CON(CH$_3$)$_2$, —CONH(C$_2$H$_5$), —CON(C$_2$H$_5$)$_2$, —CONH (i-C$_3$H$_7$), —CON (i-C$_3$H$_7$)$_2$, —CONH (Ph), —CON(Ph)$_2$, —NHCOCH$_3$ and —NHCOC$_2$H$_5$. In the present Description, "Ph" denotes a phenyl group.

In the general formula (I), the halogen-substituted hydrocarbon group containing 1 to 30 carbon atoms is a group such that at least one hydrogen atom of a hydrocarbon group containing 1 to 30 carbon atoms is substituted with a halogen atom. As the hydrocarbon group containing 1 to 30 carbon atoms, examples include those exemplified above as R$^a$. Of them, an alkyl group and an aryl group are preferred from the viewpoint of availability. As the halogen atom, examples include a fluorine atom, a chlorine atom, a bromine atom and an iodine atom.

For the number of the carbon atoms of the halogen-substituted hydrocarbon group containing 1 to 30 carbon atoms, the lower limit may be 1 or more, or it may be 2 or more. The upper limit may be 30 or less, may be 20 or less, or may be 10 or less.

As the halogen-substituted hydrocarbon group containing 1 to 30 carbon atoms, examples include, but are not limited to, a halomethyl group such that each of 1 to 3 hydrogen atoms of a methyl group is substituted with a halogen atom, a chloroethyl group, a γ-chloropropyl group, a 3,3',3"-trifluoropropyl group, a perfluoropropyl group, a perfluorophenyl group, a bromophenyl group, a chlorophenyl group, a fluorophenyl group and a dichlorophenyl group. As the halomethyl group, examples include, but are not limited to, a chloromethyl group, a bromomethyl group, a fluoromethyl group, a dichloromethyl group and a trifluoromethyl group.

In the general formula (I), as the hydrocarbon group containing 1 to 30 carbon atoms of the hydrocarbon group containing 1 to 30 carbon atoms and optionally being substituted with a functional group containing at least one selected from the group consisting of an oxygen atom, a sulfur atom and a nitrogen atom, examples include those exemplified above as R$^a$. Of them, from the viewpoint of copolymer production efficiency, an alkyl group, an aryl group or an aralkyl group is preferred as the hydrocarbon group containing 1 to 30 carbon atoms and optionally being substituted with a functional group containing at least one selected from the group consisting of an oxygen atom, a sulfur atom and a nitrogen atom.

In the general formula (I), the number of the carbon atoms of the heterocyclic ring of the heterocyclic group optionally being substituted with a functional group containing at least one selected from the group consisting of an oxygen atom, a sulfur atom and a nitrogen atom, is 2 or more. The upper limit may be 8 or less, 6 or less, or 5 or less.

As the heterocyclic group, examples include, but are not limited to, a pyridyl group, a furanyl group, a thienyl group, an oxazolyl group, an oxazolidinyl group, an isoxazolidinyl group, a thiazolyl group, a dihydrofuranyl group and a tetrahydrofuranyl group.

As the functional group containing at least one selected from the group consisting of an oxygen atom, a sulfur atom and a nitrogen atom, examples include, but are not limited to, a hydroxyl group, a formyl group, an epoxy group, an ester group containing 1 to 30 carbon atoms, an acyloxy group containing 1 to 30 carbon atoms, an acyl group containing 1 to 30 carbon atoms, an alkoxy group containing 1 to 30 carbon atoms, an aryloxy group containing 6 to 30 carbon atoms, a cyano group, a nitro group, an amino group optionally being substituted with a hydrocarbon group containing 1 to 30 carbon atoms, an amide group optionally being substituted with a hydrocarbon group containing 1 to 30 carbon atoms, an alkylthio group containing 1 to 30 carbon atoms, an arylthio group containing 6 to 30 carbon atoms, a sulfonyl group containing 1 to 30 carbon atoms, a sulfoxide group containing 1 to 30 carbon atoms, and a sulfonic acid ester group containing 1 to 30 carbon atoms.

The ester group containing 1 to 30 carbon atoms, the acyloxy group containing 1 to 30 carbon atoms, the acyl group containing 1 to 30 carbon atoms, the alkoxy group containing 1 to 30 carbon atoms, the aryloxy group containing 6 to 30 carbon atoms, the amino group optionally being substituted with a hydrocarbon group containing 1 to 30 carbon atoms, the amide group optionally being substituted with a hydrocarbon group containing 1 to 30 carbon atoms, the alkylthio group containing 1 to 30 carbon atoms, and the arylthio group containing 6 to 30 carbon atoms may be the same as those described above.

The sulfonyl group containing 1 to 30 carbon atoms is a monovalent group represented by $—SO_2R'''$ where $R'''$ is a hydrocarbon group containing 1 to 30 carbon atoms. For the number of the carbon atoms of the sulfonyl group, the lower limit may be 1 or more, or it may be 2 or more. The upper limit may be 30 or less, may be 20 or less, or may be 10 or less.

As the hydrocarbon group containing 1 to 30 carbon atoms as $R'''$, examples include those exemplified above as $R^a$.

As the sulfonyl group containing 1 to 30 carbon atoms, preferred examples include, but are not limited to, $—SO_2CH_3$ and $—SO_2Ph$.

The sulfoxide group containing 1 to 30 carbon atoms is a monovalent group represented by $—SOR''$ where $R''$ is a hydrocarbon group containing 1 to 30 carbon atoms. For the number of the carbon atoms of the sulfoxide group, the lower limit may be 1 or more, or it may be 2 or more. The upper limit may be 30 or less, may be 20 or less, or may be 10 or less.

As the hydrocarbon group containing 1 to 30 carbon atoms as $R''$, examples include those exemplified above as $R^a$.

As the sulfoxide group containing 1 to 30 carbon atoms, preferred examples include, but are not limited to, $—SOCH_3$ and $—SOPh$.

The sulfonic acid ester group containing 1 to 30 carbon atoms is a monovalent group represented by $—OSO_2R^o$ where $R^o$ is a hydrocarbon group containing 1 to 30 carbon atoms. For the number of the carbon atoms of the sulfonic acid ester group, the lower limit may be 1 or more, or it may be 2 or more. The upper limit may be 30 or less, may be 20 or less, or may be 10 or less.

As the hydrocarbon group containing 1 to 30 carbon atoms as $R^o$, examples include those exemplified above as $R^a$.

As the sulfonic acid ester group containing 1 to 30 carbon atoms, preferred examples include, but are not limited to, $—SO_3CH_3$ and $—SO_3Ph$.

From the viewpoint of copolymer production efficiency, the functional group containing at least one selected from the group consisting of an oxygen atom, a sulfur atom and a nitrogen atom, is preferably at least one selected from the group consisting of a hydroxyl group, an alkoxy group containing 1 to 30 carbon atoms, an aryloxy group containing 6 to 30 carbon atoms, an amino group optionally being substituted with a hydrocarbon group containing 1 to 30 carbon atoms, an alkylthio group containing 1 to 30 carbon atoms and an arylthio group containing 6 to 30 carbon atoms. The functional group is more preferably at least one selected from the group consisting of an alkoxy group containing 1 to 30 carbon atoms, an aryloxy group containing 6 to 30 carbon atoms and an amino group optionally being substituted with a hydrocarbon group containing 1 to 30 carbon atoms.

In the general formula (I), $R^x$ and $R^y$ may be bound to each other to form a 4- to 10-membered ring in combination with the unsaturated bond to which $R^x$ and $R^y$ are bound. The ring formed by $R^x$ and $R^y$ bound to each other, may be a carbon ring or a heterocyclic ring, and the carbon ring or the heterocyclic ring may be monocyclic or polycyclic. $R^x$ and $R^y$ may be bound to each other to form a saturated or unsaturated bond, or they may form a $—CO—O—CO—$ group or a non-aromatic ring.

For the structural unit (B), from the viewpoint of a wider range of applications of the polar group-containing olefin copolymer of the present disclosure and from the viewpoint of the stability of the compound represented by the general formula (1), at least one of $R^x$ and $R^y$ in the general formula (I) is preferably different from a hydrogen atom. That is, at least one of $R^x$ and $R^y$ is preferably a halogen atom, a hydroxyl group, a formyl group, an ester group containing 1 to 30 carbon atoms, an acyloxy group containing 1 to 30 carbon atoms, an acyl group containing 1 to 30 carbon atoms, an alkoxy group containing 1 to 30 carbon atoms, an aryloxy group containing 6 to 30 carbon atoms, an alkylthio group containing 1 to 30 carbon atoms, an arylthio group containing 6 to 30 carbon atoms, a nitro group, an amino group optionally being substituted with a hydrocarbon group containing 1 to 30 carbon atoms, a silyl group optionally being substituted with a hydrocarbon group containing 1 to 30 carbon atoms, an amide group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring.

From the viewpoint of enhancing the applicability of the polar group-containing olefin copolymer and from the viewpoint of the stability of the compound represented by the general formula (1), it is preferable that $R^x$ and $R^y$ are each independently a hydrogen atom, a hydroxyl group, a formyl group, an ester group containing 1 to 30 carbon atoms, an acyl group containing 1 to 30 carbon atoms, an alkoxy group containing 1 to 30 carbon atoms, an amino group optionally being substituted with a hydrocarbon group containing 1 to 30 carbon atoms, a silyl group optionally being substituted with a hydrocarbon group containing 1 to 30 carbon atoms, a halogen-substituted hydrocarbon group containing 1 to 30 carbon atoms, or a hydrocarbon group containing 1 to 30 carbon atoms and optionally being substituted with a functional group containing at least one selected from the group consisting of an oxygen atom, a sulfur atom and a nitrogen atom, or $R^x$ and $R^y$ are optionally bound to each other to form a 4- to 10-membered ring, and at least one of $R^x$ and $R^y$ is different from a hydrogen atom. That is, it is preferable that at least one of $R^x$ and $R^y$ is a hydroxyl group, a formyl group, an ester group containing 1 to 30 carbon atoms, an acyl group containing 1 to 30 carbon atoms, an alkoxy group containing 1 to 30 carbon atoms, an amino group optionally being substituted with a hydrocarbon group containing 1 to 30 carbon atoms, a silyl group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring.

When at least one of $R^x$ and $R^y$ is a group different from a hydrogen atom, for example, at least one of $R^x$ and $R^y$ is thought to function as a leaving group. When $R^x$ or $R^y$ functions as a leaving group, $R^x$ or $R^y$ can be the starting point for introducing a different substituent when the polar group-containing olefin copolymer is used for the Heck reaction, the Wacker reaction, etc. The group that functions as a leaving group is preferably a functional group containing a polar group, such as a halogen atom and an acyloxy group.

For the structural unit (B), from the viewpoint of enhancing the applicability of the polar group-containing olefin copolymer of the present disclosure, it is preferable that $R^x$ and $R^y$ in the general formula (I) are each independently a halogen atom, a hydroxyl group, a formyl group, an ester group containing 1 to 30 carbon atoms, an acyloxy group containing 1 to 30 carbon atoms, an acyl group containing 1 to 30 carbon atoms, an alkoxy group containing 1 to 30 carbon atoms, an aryloxy group containing 6 to 30 carbon atoms, an alkylthio group containing 1 to 30 carbon atoms, an arylthio group containing 6 to 30 carbon atoms, an amino group optionally being substituted with a hydrocarbon group containing 1 to 30 carbon atoms, a silyl group optionally being substituted with a hydrocarbon group containing 1 to 30 carbon atoms, an amide group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring. It is more preferable that $R^x$ and $R^y$ in the general formula (I) are each independently a hydroxyl group, a formyl group, an ester group containing 1 to 30 carbon atoms, an acyl group containing 1 to 30 carbon atoms, an alkoxy group containing 1 to 30 carbon atoms, an aryloxy group containing 6 to 30 carbon atoms, an alkylthio group containing 1 to 30 carbon atoms, an arylthio group containing 6 to 30 carbon atoms, an amino group optionally being substituted with a hydrocarbon group containing 1 to 30 carbon atoms, a silyl group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring.

It is even more preferable that $R^x$ and $R^y$ are each independently a hydroxyl group, a formyl group, an ester group containing 1 to 30 carbon atoms, an acyl group containing 1 to 30 carbon atoms, an alkoxy group containing 1 to 30 carbon atoms, an amino group optionally being substituted with a hydrocarbon group containing 1 to 30 carbon atoms, a silyl group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring. It is still more preferable that $R^x$ and $R^y$ are each independently a formyl group, an ester group containing 1 to 30 carbon atoms, an acyl group containing 1 to 30 carbon atoms, an alkoxy group containing 1 to 30 carbon atoms, an amino group optionally being substituted with a hydrocarbon group containing 1 to 30 carbon atoms, a silyl group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom. It is yet more preferable that $R^x$ and $R^y$ are each independently an alkoxy group containing 1 to 30 carbon atoms, an amino group optionally being substituted with a hydrocarbon group containing 1 to 30 carbon atoms, a silyl group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom.

When $R^x$ and $R^y$ are each independently a group different from a hydrogen atom, the polar group-containing olefin copolymer of the present disclosure contains three functional groups and one unsaturated bond always in the same sequence in the structural unit (B). Accordingly, for example, when the functional group is a polar functional group having metal coordination properties, the polar group-containing olefin copolymer of the present disclosure is expected to function as a functional substance having chelate coordination properties with metal complexes, etc. Due to this function, the polar group-containing olefin copolymer of the present disclosure is also expected to be usable as a carrier for metal complex catalysts, an adsorbent for metal complex recovery, etc. As the polar functional group having metal coordination properties as $R^x$ and $R^y$, preferred examples include, but are not limited to, a hydroxyl group that can be a β-keto-enolate ligand, an amino group that can be a β-keto-iminato ligand, an alkoxy group, an aryloxy group, an alkylthio group, an arylthio group, a halogen atom, and a hydrocarbon group containing 1 to 30 carbon atoms and being substituted with these functional groups.

When the polar group-containing olefin copolymer of the present disclosure contains three functional groups and one unsaturated bond always in the same sequence in the structural unit (B), there is a possibility that such a structural unit has various resonance structures, and the polar group-containing olefin copolymer of the present disclosure is expected to be usable in pigments, dyes, medicines, etc.

$R^x$ and $R^y$ in the general formula (I) may be the same or different.

As the structural unit which is represented by the general formula (I) and which contains three functional groups and one unsaturated bond, examples include, but are not limited to, the following structural units.

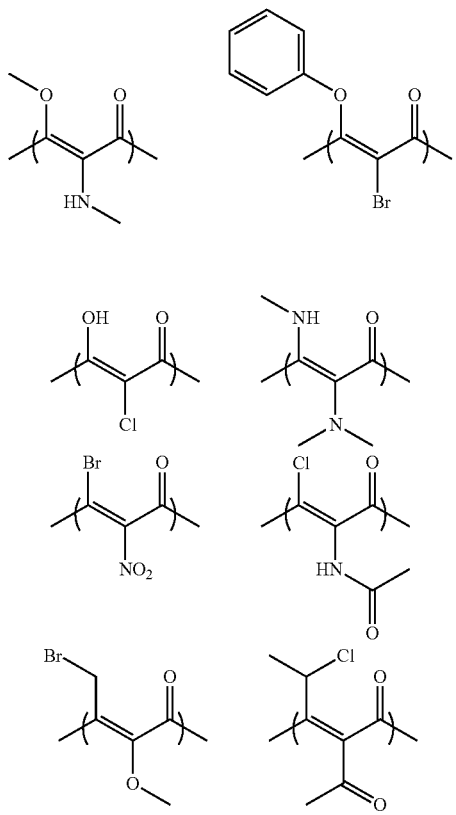

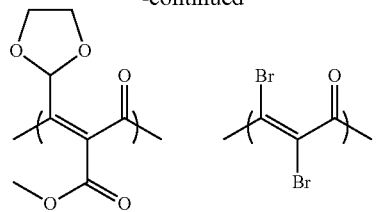

From the viewpoint of copolymer production efficiency, the structural unit (B) represented by the general formula (I) is preferably a structural unit derived from one or more monomers (B) selected from the group consisting of polar group-containing monomers represented by the following general formula (1), since the structural unit (B) can be introduced into the copolymer by one-step polymerization reaction. The polar group-containing monomer(s) represented by the general formula (1) is ring-opened in the polymerization reaction and incorporated into the main chain of the polymer to be the structural unit (B).

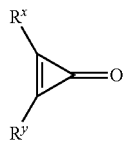

General Formula (1)

where $R^x$ and $R^y$ are each independently a hydrogen atom, a halogen atom, a hydroxyl group, a formyl group, an ester group containing 1 to 30 carbon atoms, an acyloxy group containing 1 to 30 carbon atoms, an acyl group containing 1 to 30 carbon atoms, an alkoxy group containing 1 to 30 carbon atoms, an aryloxy group containing 6 to 30 carbon atoms, an alkylthio group containing 1 to 30 carbon atoms, an arylthio group containing 6 to 30 carbon atoms, a nitro group, an amino group optionally being substituted with a hydrocarbon group containing 1 to 30 carbon atoms, a silyl group optionally being substituted with a hydrocarbon group containing 1 to 30 carbon atoms, an amide group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring.

$R^x$ and $R^y$ in the general formula (1) are the same as the above-described $R^x$ and $R^y$ in the general formula (I).

As the polar group-containing monomer represented by the general formula (1), for example, 2,3-diarylcyclopropen-1-one, 2,3-diheteroarylcyclopropen-1-one, 2,3-dialkylcyclopropen-1-one, and 2-alkyl-3-arylcyclopropen-1-one are preferably used.

As the 2,3-diarylcyclopropen-1-one and 2,3-diheteroaryl-cyclopropen-1-one, examples include, but are not limited to, compounds having the following structures.

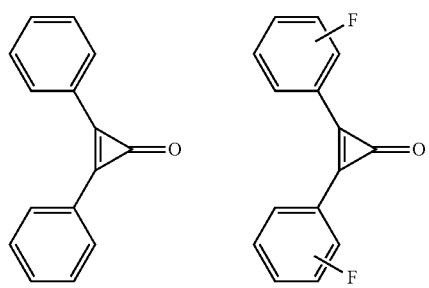
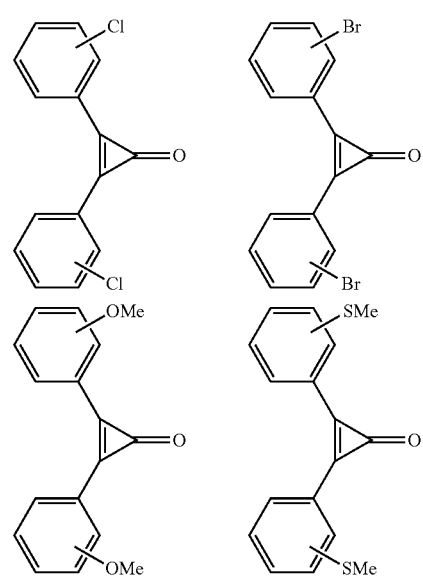
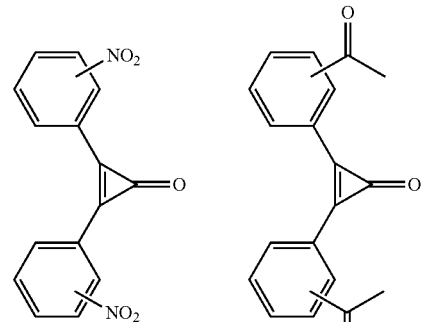
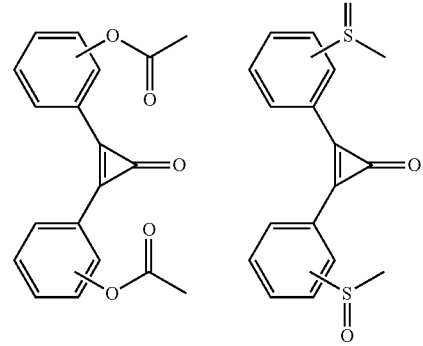
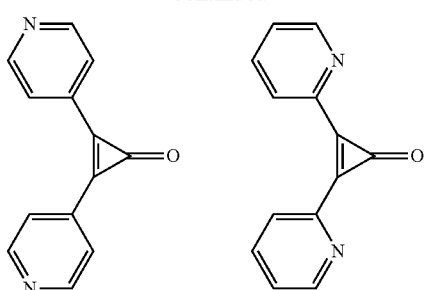
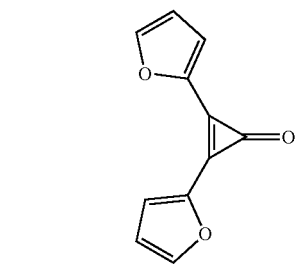
As the 2,3-dialkylcyclopropen-1-one, examples include, but are not limited to, compounds having the following structures.
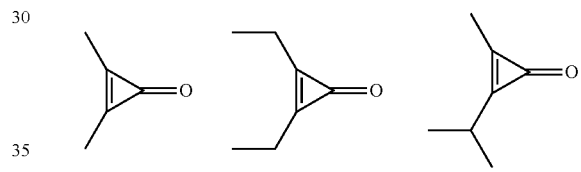
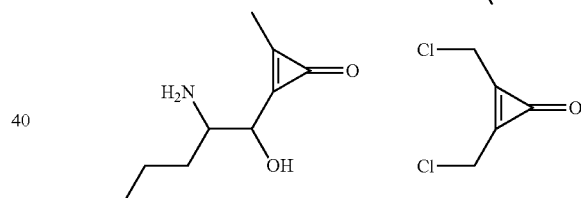
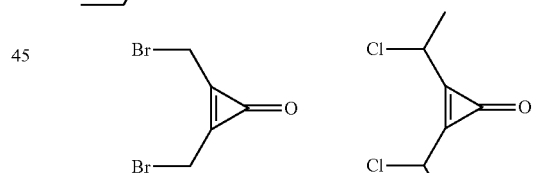
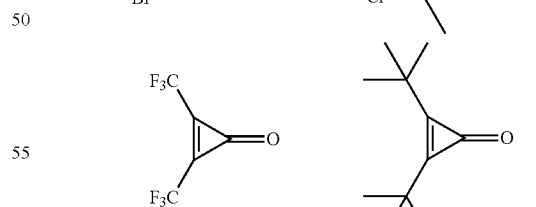
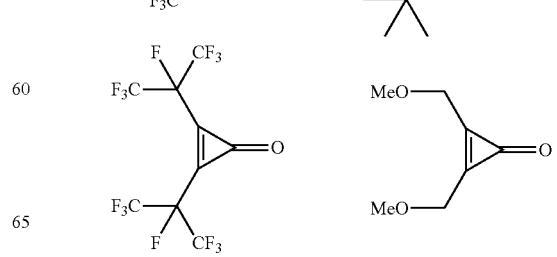

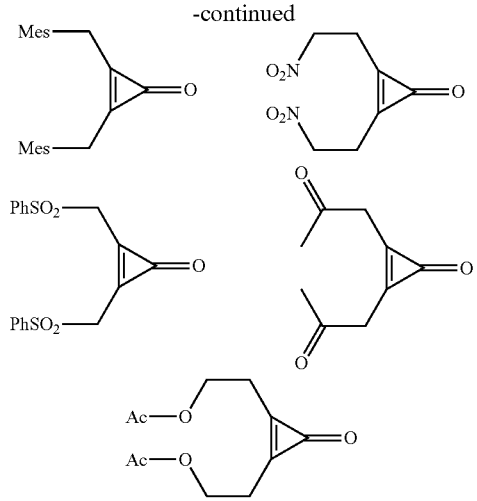

As other compounds in each of which $R^x$ and $R^y$ in the general formula (1) are each independently a hydrogen atom, a halogen atom, a hydroxyl group, a formyl group, an ester group containing 1 to 30 carbon atoms, an acyloxy group containing 1 to 30 carbon atoms, an acyl group containing 1 to 30 carbon atoms, an alkoxy group containing 1 to 30 carbon atoms, an aryloxy group containing 6 to 30 carbon atoms, an alkylthio group containing 1 to 30 carbon atoms, an arylthio group containing 6 to 30 carbon atoms, a nitro group, an amino group optionally being substituted with a hydrocarbon group containing 1 to 30 carbon atoms, a silyl group optionally being substituted with a hydrocarbon group containing 1 to 30 carbon atoms, an amide group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, examples include, but are not limited to, compounds having the following structures.

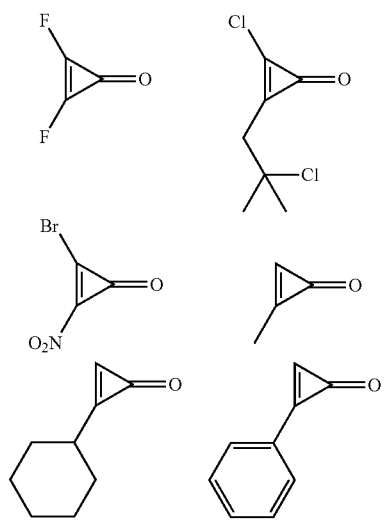

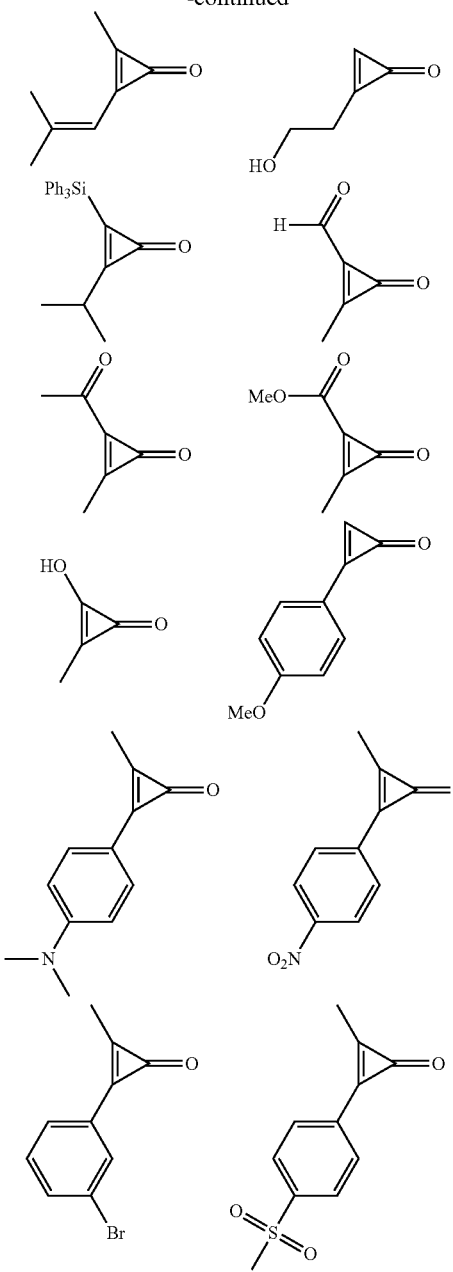

-continued

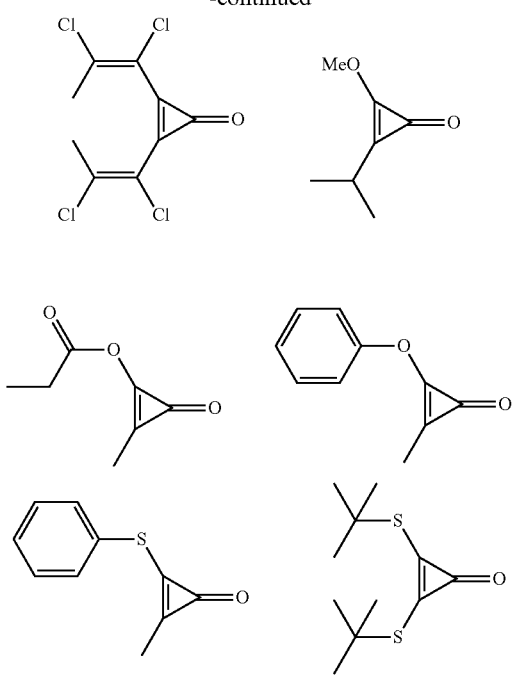

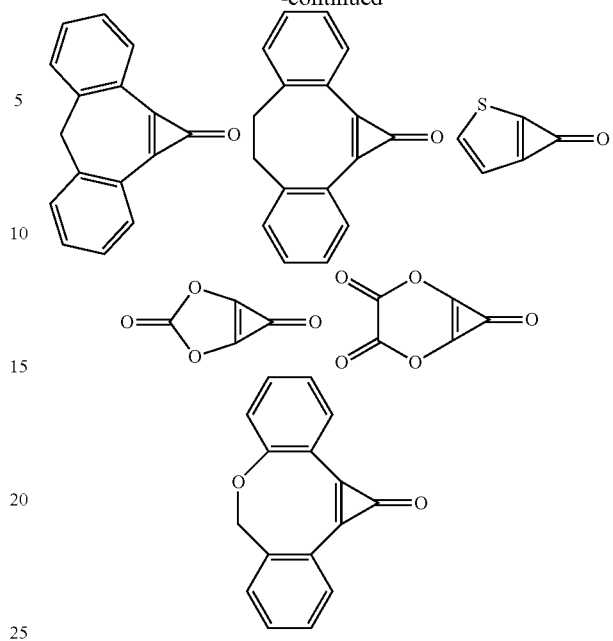

As the compound in which $R^x$ and $R^y$ in the general formula (1) form a ring structure, examples include, but are not limited to, compounds having the following structures.

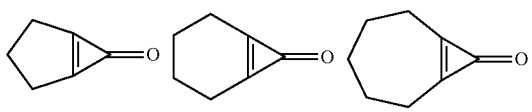

The one or more monomers (B) selected from the group consisting of polar group-containing monomers represented by the general formula (1) can be produced by appropriately combining conventionally-known production methods. For example, the following production methods can be used: a production method by the reaction of various types of alkynes, dichlorocarbene precursors and water (J. Am. Chem. Soc. 1966, 88(3), 504-509), a production method by introducing a substituent by the action of an electrophile on various types of cyclopropenone acetals (Tetrahedron 1992, 48(11), 2045-2057), a production method by isomerizing various types of cyclobutenediones by light to derive them (J. Am. Chem. Soc. 1976, 98(12), 3641-3644) and a production method by closing a 3-membered ring by debromination of a 1,3-dibromo-2-propanone structure (J. Am. Chem. Soc. 1965, 87(6), 1326-1331).

As the one or more monomers (B) selected from the group consisting of polar group-containing monomers represented by the general formula (1), commercially-available products may be used.

(3) Structural Unit (C)

The structural unit (C) is a structural unit derived from one or more monomers (C) selected from the group consisting of a polar group-containing monomer (c-1) represented by the following general formula (2) and a polar group-containing monomer (c-2) represented by the following general formula (3):

General Formula (2)

where $R^1$ and $R^2$ are each independently a hydrogen atom, an ester group containing 1 to 30 carbon atoms, an acyloxy group containing 1 to 30 carbon atoms, an alkoxy group containing 1 to 30 carbon atoms, an aryloxy group contain-

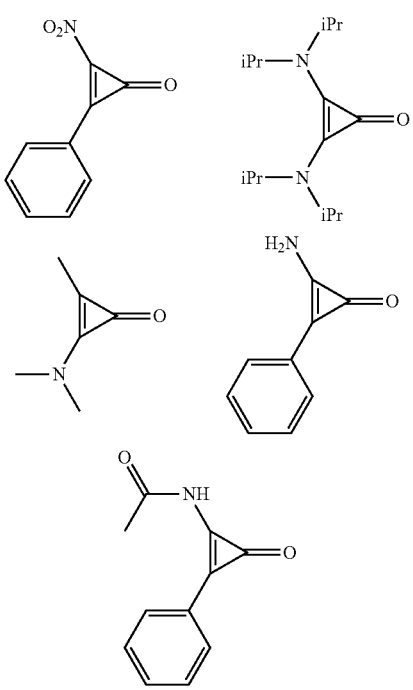

ing 6 to 30 carbon atoms, a cyano group, an amino group optionally being substituted with a hydrocarbon group containing 1 to 30 carbon atoms, an amide group optionally being substituted with a hydrocarbon group containing 1 to 30 carbon atoms, an imino group optionally being substituted with a hydrocarbon group containing 1 to 30 carbon atoms, a halogen-substituted hydrocarbon group containing 1 to 30 carbon atoms, or a hydrocarbon group containing 1 to 30 carbon atoms and optionally being substituted with a functional group containing at least one selected from the group consisting of an oxygen atom, a sulfur atom, a nitrogen atom and a phosphorus atom, and at least one of $R^1$ and $R^2$ is a group containing at least one of an oxygen atom and a nitrogen atom, and

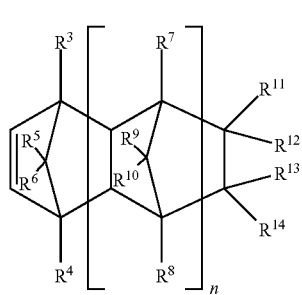

General Formula (3)

where $R^3$ to $R^{10}$ are each independently a hydrogen atom, a halogen atom or a hydrocarbon group containing 1 to 20 carbon atoms; n is 0 or a positive integer, and when n is 2 or more, $R^7$ to $R^{10}$ are each optionally the same or different in each repeating unit; $R^{11}$ to $R^{14}$ are each independently a hydrogen atom, an ester group containing 1 to 30 carbon atoms, an acyloxy group containing 1 to 30 carbon atoms, an alkoxy group containing 1 to 30 carbon atoms, an aryloxy group containing 6 to 30 carbon atoms, a cyano group, an amino group optionally being substituted with a hydrocarbon group containing 1 to 30 carbon atoms, an amide group optionally being substituted with a hydrocarbon group containing 1 to 30 carbon atoms, an imino group optionally being substituted with a hydrocarbon group containing 1 to 30 carbon atoms, or a hydrocarbon group containing 1 to 30 carbon atoms and optionally being substituted with a functional group containing at least one selected from the group consisting of an oxygen atom, a sulfur atom, a nitrogen atom and a phosphorus atom, and at least one of $R^{11}$ to $R^{14}$ is a group containing at least one of an oxygen atom and a nitrogen atom; and $R^{11}$ and $R^{12}$ are optionally integrated to form a divalent organic group, and $R^{13}$ and $R^{14}$ are optionally integrated to form a divalent organic group; $R^{11}$ or $R^{12}$ optionally forms a ring with $R^{13}$ or $R^{14}$.

(3-1) Polar Group-Containing Monomer (c-1)

In the general formula (2), the ester group containing 1 to 30 carbon atoms, the acyloxy group containing 1 to 30 carbon atoms, the alkoxy group containing 1 to 30 carbon atoms, the aryloxy group containing 6 to 30 carbon atoms, the amino group optionally being substituted with a hydrocarbon group containing 1 to 30 carbon atoms, the amide group optionally being substituted with a hydrocarbon group containing 1 to 30 carbon atoms, the imino group optionally being substituted with a hydrocarbon group containing 1 to 30 carbon atoms, and the halogen-substituted hydrocarbon group containing 1 to 30 carbon atoms may be the same as those described above for the general formula (I).

Also in the general formula (2), among hydrocarbon groups containing 1 to 30 carbon atoms and optionally being substituted with a functional group containing at least one selected from the group consisting of an oxygen atom, a sulfur atom, a nitrogen atom and a phosphorus atom, the hydrocarbon group containing 1 to 30 carbon atoms and optionally being substituted with a functional group containing at least one selected from the group consisting of an oxygen atom, a sulfur atom and a nitrogen atom, may be the same as that described above for the general formula (I).

As the hydrocarbon group containing 1 to 30 carbon atoms of the hydrocarbon group containing 1 to 30 carbon atoms and optionally being substituted with a functional group containing a phosphorus atom, examples include those exemplified above as $R^a$.

As the functional group containing a phosphorus atom, examples include, but are not limited to, a phosphite group containing 1 to 30 carbon atoms, a phosphate group containing 1 to 30 carbon atoms, and a phosphorus ylide group containing 1 to 30 carbon atoms.

The phosphite group containing 1 to 30 carbon atoms is a monovalent group represented by $—P(OR^p)_2$ where $R^p$ is each independently a hydrocarbon group containing 1 to 30 carbon atoms. For the number of the carbon atoms of the phosphite group, the lower limit may be 1 or more, or it may be 2 or more. The upper limit may be 30 or less, may be 20 or less, or may be 10 or less.

As the hydrocarbon group containing 1 to 30 carbon atoms as $R^p$, examples include those exemplified above as $R^a$.

As the phosphite group containing 1 to 30 carbon atoms, preferred examples include, but are not limited to, $—P(OPh)_2$ and $—P(OCH_3)_2$.

The phosphate group containing 1 to 30 carbon atoms is a monovalent group represented by $—P(=O)(OR^q)_2$ where $R^q$ is each independently a hydrocarbon group containing 1 to 30 carbon atoms. For the number of the carbon atoms of the phosphate group, the lower limit may be 1 or more, or it may be 2 or more. The upper limit may be 30 or less, may be 20 or less, or may be 10 or less.

As the hydrocarbon group containing 1 to 30 carbon atoms as $R^q$, examples include those exemplified above as $R^a$.

As the phosphate group containing 1 to 30 carbon atoms, preferred examples include, but are not limited to, $—P(=O)(OPh)_2$ and $—P(=O)(OCH_3)_2$.

The phosphorus ylide group containing 1 to 30 carbon atoms is a monovalent group represented by $—P=CR^rR^s$ where $R^r$ and $R^s$ are each independently a hydrogen atom or a hydrocarbon group containing 1 to 30 carbon atoms and at least one is the hydrocarbon group. The number of the carbon atoms of the hydrocarbon group substituted to the phosphorus ylide group, does not include the number of the carbon atoms of $P=C$, and it is the number of the carbon atoms of $R^r$ or $R^s$. The lower limit may be 1 or more, or it may be 2 or more. The upper limit may be 30 or less, may be 20 or less, or may be 10 or less.

As the hydrocarbon group containing 1 to 30 carbon atoms as $R^r$ and $R^s$, examples include those exemplified above as $R^a$.

As the phosphorus ylide group containing 1 to 30 carbon atoms, preferred examples include, but are not limited to, $—P=CHCH_3$, $—P=CHPh$ and $—P=CHCH_2Ph$.

At least one of $R^1$ and $R^2$ is a group containing at least one of an oxygen atom and a nitrogen atom. As the group containing at least one of an oxygen atom and a nitrogen atom, examples include an ester group containing 1 to 30 carbon atoms, an acyloxy group containing 1 to 30 carbon atoms, an alkoxy group containing 1 to 30 carbon atoms, an aryloxy group containing 6 to 30 carbon atoms, a cyano group, an amino group optionally being substituted with a hydrocarbon group containing 1 to 30 carbon atoms, an amide group optionally being substituted with a hydrocarbon group containing 1 to 30 carbon atoms, an imino group optionally being substituted with a hydrocarbon group containing 1 to 30 carbon atoms, and a hydrocarbon group containing 1 to 30 carbon atoms and being substituted with a substituent containing at least one of an oxygen atom and a nitrogen atom. As the substituent containing at least one of an oxygen atom and a nitrogen atom of the hydrocarbon group containing 1 to 30 carbon atoms, examples include, but are not limited to, a hydroxyl group, an epoxy group, an ester group containing 1 to 30 carbon atoms, an acyloxy group containing 1 to 30 carbon atoms, an alkoxy group containing 1 to 30 carbon atoms, an aryloxy group containing 6 to 30 carbon atoms, a cyano group, an amino group optionally being substituted with a hydrocarbon group containing 1 to 30 carbon atoms, an amide group optionally being substituted with a hydrocarbon group containing 1 to 30 carbon atoms, an imino group optionally being substituted with a hydrocarbon group containing 1 to 30 carbon atoms, a thioester group containing 1 to 30 carbon atoms, a sulfonyl group containing 1 to 30 carbon atoms, a sulfoxide group containing 1 to 30 carbon atoms, a sulfonic acid ester group containing 1 to 30 carbon atoms, a phosphite group containing 1 to 30 carbon atoms, and a phosphate group containing 1 to 30 carbon atoms.

As the polar group-containing monomer (c-1) represented by the general formula (2), for example, a (meth)acrylic acid ester is preferably used.

As the (meth)acrylic acid ester, examples include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, hydroxyethyl (meth)acrylate, hydroxybutyl (meth)acrylate, 1,4-cyclohexanedimethanol mono(meth)acrylate, 4-hydroxybutyl (meth)acrylate glycidyl ether, polyethylene glycol (meth)acrylate ester, dimethylaminoethyl (meth)acrylate, diethylaminoethyl (meth)acrylate, 2-aminoethyl (meth)acrylate, 2-methoxyethyl (meth)acrylate, 3-methoxypropyl (meth)acrylate, glycidyl (meth)acrylate, trifluoromethyl (meth)acrylate, 2-trifluoromethylethyl (meth)acrylate, perfluoroethyl (meth) acrylate, and 4-(1,2,2,6,6-pentamethylpiperidyl) acrylate.

As the polar group-containing monomer (c-1) represented by the general formula (2), examples include, but are not limited to, (meth)acrylamide, (meth)acrylonitrile, vinylamide, vinyl acetate, allyl acetate, 3-butenyl acetate, 3-cyanopropene, methyl vinyl ether, 3-chloropropene, N-propylidene ethenamine, 3-(methylthio)-1-propene, 3-(methylsulfinyl)-1-propene, 3-(methylsulfonyl)-1-propene, 2-propene-1-sulfonic acid methyl ester, and 2-propenylphosphonic acid dimethyl ester.

In the general formula (2), $R^1$ is preferably a hydrogen atom, from the viewpoint of polymer production efficiency, polymer molecular weight, and copolymerizability with the monomers (A) and (B).

Also in the general formula (2), it is preferable that $R^1$ is a hydrogen atom, and $R^2$ is an ester group containing 1 to 30 carbon atoms, a cyano group, a cyanomethyl group, a cyanoethyl group, a halomethyl group, an acyloxymethyl group or an acyloxyethyl group, from the viewpoint of polymer production efficiency, polymer molecular weight, and copolymerizability with the monomers (A) and (B).

The polar group-containing monomer (c-1) represented by the general formula (2) is preferably at least one selected from the group consisting of methyl acrylate, ethyl acrylate, propyl acrylate, butyl acrylate, vinyl acetate, allyl acetate, 3-butenyl acetate, acrylonitrile and 3-cyanopropene, from the following viewpoint: high weight ratio of the heteroatom; few side effects on late transition metal catalysts; polymer production efficiency; polymer molecular weight; and copolymerizability with the monomers (A) and (B).

(3-2) Polar Group-Containing Monomer (c-2)

As the halogen atom as $R^3$ to $R^{10}$ in the general formula (3), examples include a fluorine atom, a chlorine atom and a bromine atom.

As the hydrocarbon group containing 1 to 20 carbon atoms as $R^3$ to $R^{10}$, examples include those exemplified above as $R^a$ in the general formula (I), such as an alkyl group such as a methyl group, an ethyl group and a propyl group; a cycloalkyl group such as a cyclopentyl group and a cyclohexyl group; and an alkenyl group such as a vinyl group, an allyl group and a propenyl group.

In the general formula (3), "n" is 0 or a positive integer. It is preferably 2 or less, and more preferably 1 or less.

As $R^{11}$ to $R^{14}$ in the general formula (3), the ester group containing 1 to 30 carbon atoms, the acyloxy group containing 1 to 30 carbon atoms, the alkoxy group containing 1 to 30 carbon atoms, the amino group optionally being substituted with a hydrocarbon group containing 1 to 30 carbon atoms, the amide group optionally being substituted with a hydrocarbon group containing 1 to 30 carbon atoms, the imino group optionally being substituted with a hydrocarbon group containing 1 to 30 carbon atoms, or the hydrocarbon group containing 1 to 30 carbon atoms and optionally being substituted with a functional group containing at least one selected from the group consisting of an oxygen atom, a sulfur atom, a nitrogen atom and a phosphorus atom, may be the same as those described above as $R^1$ and $R^2$ in the general formula (2).

In the general formula (3), at least one of $R^{11}$ to $R^{14}$ is a group containing at least one of an oxygen atom and a nitrogen atom. The group containing at least one of an oxygen atom and a nitrogen atom may be the same as those described above as $R^1$ and $R^2$ in the general formula (2).

$R^{11}$ and $R^{12}$ are optionally integrated to form a divalent organic group, and $R^{13}$ and $R^{14}$ are optionally integrated to form a divalent organic group. The organic group means a group containing at least a carbon atom. When each of them is integrated to form a divalent organic group, it is preferably a divalent hydrocarbon group, and the hydrocarbon group may contain a linking group such as —CO—, —O(CO)—, —COO—, —C(=O) OC(=O)—, —C(=O) NR$^f$C(=O)— (where $R^f$ is as described above), —SO$_2$— and —O—.

$R^{11}$ or $R^{12}$ is optionally bound to each other with $R^{13}$ or $R^{14}$ to form a ring. They may form a carbon ring or heterocyclic ring, and the carbon ring or heterocyclic ring may be monocyclic or polycyclic. For example, $R^{11}$ or $R^{12}$ is optionally bound to each other with $R^{13}$ or $R^{14}$ to form a —CO—O—CO— group.

In the general formula (3), from the viewpoint of ease of synthesizing the polar monomer itself, n is preferably 0 or 1, and $R^3$ to $R^{10}$ are preferably a hydrogen atom or methyl group.

From the viewpoint of few side effects on late transition metal catalysts, polymer production efficiency, polymer molecular weight, and copolymerizability with the monomers (A) and (B), the polar group-containing monomer (c-2) represented by the general formula (3) is preferably at least one selected from the group consisting of methyl 5-norbornene-2-carboxylate, ethyl 5-norbornene-2-carboxylate, propyl 5-norbornene-2-carboxylate, butyl 5-norbornene-2-carboxylate, dimethyl 5-norbornene-2,3-dicarboxylate, 5-norbornene-2,3-dicarboxylic anhydride, 2-hydroxy-5-norbornene, 5-norbornene-2-methanol, 5-norbornene-2-methylamine, 2-acetoxy-5-norbornene, 2-cyanomethyl-5-norbornene, and 5-norbornene-2-carbonitrile. Also, the polar group-containing monomer (c-2) is more preferably at least one selected from the group consisting of methyl 5-norbornene-2-carboxylate, ethyl 5-norbornene-2-carboxylate, propyl 5-norbornene-2-carboxylate, butyl 5-norbornene-2-carboxylate, 5-norbornene-2,3-dicarboxylic anhydride, and 5-norbornene-2-methanol.

(4) Other Structural Unit

The polar group-containing olefin copolymer of the present disclosure may further contain other structural unit different from the structural units (A), (B) and (C). As the other structural unit, examples include, but are not limited to, a structural unit represented by the following formula (II). The structural unit represented by the following formula (II) may be a structural unit derived from the one or more monomers (B) selected from the group consisting of polar group-containing monomers represented by the general formula (1).

Formula (II)

(5) Polar Group-Containing Olefin Copolymer

The polar group-containing olefin copolymer of the present disclosure comprises a structural unit (A) derived from one or more monomers selected from the group consisting of ethylene and an olefin containing 3 to 20 carbon atoms, and a structural unit (B) represented by the general formula (I).

The polar group-containing olefin copolymer of the present disclosure needs to contain at least one kind of structural unit (A) and at least one kind of structural unit (B), and it needs to contain structural units derived from a total of two or more kinds of monomers.

In the present disclosure, the percentage of the structural unit (A) in the polar group-containing olefin copolymer may be appropriately selected depending on the desired properties. For the total 100 mol % of the structural units, the lower limit is generally 60.00 mol % or more, preferably 65.50 mol % or more, more preferably 76.00 mol % or more, still more preferably 85.00 mol % or more, and particularly preferably 87.00 mol % or more. On the other hand, the upper limit is generally 99.98 mol % or less, preferably 99.92 mol % or less, more preferably 99.90 mol % or less, still more preferably 99.80 mol % or less, and even more preferably 99.70 mol % or less.

The percentage of the structural unit (B) in the polar group-containing olefin copolymer may be appropriately selected depending on the average molecular weight and the desired properties. For the total 100 mol % of the structural units, the lower limit is generally 0.01 mol % or more, preferably 0.05 mol % or more, more preferably 0.10 mol % or more, and still more preferably 0.20 mol % or more. On the other hand, the upper limit is generally 15.00 mol % or less, preferably 10.00 mol % or less, more preferably 8.00 mol % or less, and still more preferably 6.00 mol % or less.

The polar group-containing olefin copolymer of the present disclosure may further comprise one or more structural units (C) derived from one or more monomers selected from the group consisting of the polar group-containing monomer (c-1) and the polar group-containing monomer (c-2).

When the polar group-containing olefin copolymer of the present disclosure contain the structural unit (C), the percentage of the structural unit (C) in the polar group-containing olefin copolymer may be appropriately selected depending on the desired properties. For the total 100 mol % of the structural units, the lower limit is generally 0.01 mol % or more, preferably 0.05 mol % or more, more preferably 0.10 mol % or more, and still more preferably 0.50 mol % or more. On the other hand, the upper limit is generally 35.00 mol % or less, preferably 30.00 mol % or less, more preferably 20.00 mol % or less, and still more preferably 10.00 mol % or less.

The polar group-containing olefin copolymer of the present disclosure may further contain the structural unit represented by the formula (II).

When the polar group-containing olefin copolymer of the present disclosure contain the structural unit represented by the formula (II), the percentage of the structural unit contained in the polar group-containing olefin copolymer may be appropriately selected depending on the desired properties. For the total 100 mol % of the structural units, the lower limit is generally 0.001 mol % or more, may be 0.005 mol % or more, or may be 0.01 mol % or more. On the other hand, the upper limit is generally 15.00 mol % or less, preferably 10.00 mol % or less, more preferably 3.00 mol % or less, and still more preferably 2.00 mol % or less.

For the total 100 mol % of the structural unit (B) and the structural unit represented by the formula (II), the percentage of the structural unit (B) is generally 50 mol % or more, preferably 55 mol % or more, and more preferably 60 mol % or more.

From the viewpoint of a wider range of applications of the polar group-containing olefin copolymer, the percentage of the structural unit (B) in the polar group-containing olefin copolymer is preferably larger than the percentage of the structural unit represented by the formula (II).

The structure derived from one molecule of each monomer is defined as one structural unit in the polar group-containing olefin copolymer.

The percentage by mol (mol %) of each structural unit when the whole structural units of the polar group-containing olefin copolymer are defined as 100 mol %, is the structural unit amount.

As the polar group-containing olefin copolymer of the present disclosure, examples include, but are not limited to, random, block and graft copolymers of the structural unit (A), the structural unit (B) and the optionally contained structural unit (C). Of them, the polar group-containing olefin copolymer may be the random copolymer since the structural unit (B) can be contained in large amounts.

In the polar group-containing olefin copolymer of the present disclosure, the mol fraction [A] of the structural unit (A), the mol fraction [B] of the structural unit (B), and the mol fraction [C] of the optionally contained structural unit (C) preferably satisfy the following: [A]≥{([A]+[B]+[C])× 80%}, in order for the copolymer to also keep olefin properties such as hydrophobicity.

The structural unit amounts can be controlled by the selection of the catalyst, the amounts of the monomers (A), (B) and (C) added for polymerization, and the pressure and temperature of polymerization. As a means for increasing the structural unit amounts derived from the monomers (B) and (C) in the copolymer, it is effective to increase the amounts of the monomers (B) and (C) added for polymerization, to decrease olefin pressure in polymerization, and to increase the temperature of polymerization. For example, it is required to control the structural unit amounts within the desired copolymer range by adjusting these factors.

The structural unit amount of the polar group-containing olefin copolymer of the present disclosure is obtained by use of a $^1$H-NMR spectrum and a $^{13}$C-NMR spectrum. The NMR spectrum is measured by the following method.

The polar group-containing olefin copolymer is dissolved by heating in 1,1,2,2-tetrachloroethane-d2 to obtain a homogenous solution, and the solution is subjected to NMR measurement. The $^1$H-NMR spectrum is a spectrum for a 5 mass % solution of the polar group-containing olefin copolymer, and the $^{13}$C-NMR spectrum is a spectrum for a 15 mass % solution of the polar group-containing olefin copolymer.

As another method, about 150 mg of the polar group-containing olefin copolymer may be dissolved by heating in 2.4 mL of a mixed solvent of (1,2-dichlorobenzene:bromobenzene-d5=1:2) to obtain a homogenous solution, and the homogenous solution may be subjected to NMR measurement.

The NMR measurement is carried out at 120° C. using ASCEND 500 (manufactured by BRUKER) or AVANCE 400 (manufactured by BRUKER), for example.

The $^{13}$C-NMR is measured using chromium(III) acetylacetonate as a relaxation reagent and using an inverse-gated decoupling method (a 90° pulse of 9.0 microseconds, spectral width: 31 kHz, relaxation time: 10 seconds, acquisition time: 10 seconds, and accumulated number of times of FID: 5,000 to 10,000), and then quantitative analysis is performed. Or, the $^{13}$C-NMR may be measured using an inverse-gated decoupling method (a 90° pulse of 15.8 microseconds, spectral width: 25 kHz, relaxation time: 50 seconds, acquisition time: 1.5 seconds, and accumulated number of times of FID: 1,024), and then quantitative analysis is performed.

The weight average molecular weight (Mw) of the polar group-containing olefin copolymer of the present disclosure is in a range of generally from 1,000 to 2,000,000, preferably from 10,000 to 1,500,000, more preferably from 20,000 to 1,000,000, still more preferably from 31,000 to 800,000, and even more preferably from 35,000 to 800,000. If the Mw is less than 1,000, physical properties such as mechanical strength and impact resistance may be insufficient. If the Mw is more than 2,000,000, the melt viscosity may become very high, and then mold processing may be difficult.

The number average molecular weight (Mn) of the polar group-containing olefin copolymer of the present disclosure is in a range of generally from 1,000 to 2,000,000, preferably from 3,000 to 1,500,000, more preferably from 4,000 to 1,000,000, still preferably from 5,000 to 800,000, and even more preferably from 5,000 to 600,000. If the Mn is less than 1,000, physical properties such as mechanical strength and impact resistance may be insufficient. If the Mn is more than 2,000,000, the melt viscosity may become very high, and then mold processing may be difficult.

The ratio (Mw/Mn) between the weight average molecular weight (Mw) and number average molecular weight (Mn) of the polar group-containing olefin copolymer of the present disclosure, is in a range of generally from 1.0 to 4.0, preferably from 1.3 to 3.5, and more preferably from 1.4 to 3.3. If the ratio (Mw/Mn) is less than 1.0, various processability such as molding may be insufficient. If the ratio (Mw/Mn) is more than 4.0, mechanical properties may be inferior.

In the present disclosure, the ratio (Mw/Mn) may be referred to as "molecular weight distribution parameter".

In the present disclosure, the weight average molecular weight (Mw) and the number average molecular weight (Mn) are obtained by gel permeation chromatography (GPC).

In the present disclosure, an example of the GPC measurement method is as follows.

The number average molecular weight and the weight average molecular weight can be calculated using high-temperature GPC device HLC-8321GPC/HT manufactured by Tosoh Corporation, which is equipped with TSKgel GMHHR-H(S)HT columns manufactured by Tosoh Corporation (two 7.8 mm I.D.×30 cm columns in series), by size exclusion chromatography in which polystyrene is used as a standard substance for molecular weight (solvent: 1,2-dichlorobenzene, temperature: 145° C.), or the number average molecular weight and the weight average molecular weight can be calculated using high-temperature GPC device ALC/GPC 150C manufactured by Waters Corporation, which is equipped with AT-806MS columns manufactured by Showa Denko K. K. (three 8.0 mm I.D.×25 cm columns in series), by size exclusion chromatography in which polystyrene is used as a standard substance for molecular weight (solvent: 1,2-dichlorobenzene, temperature: 140° C.).

The melting point (Tm, ° C.) of the polar group-containing olefin copolymer of the present disclosure, which is observed by differential scanning calorimetry (DSC), is not particularly limited. The melting point is preferably more than 50° C. and 140° C. or less, more preferably from 60° C. to 138° C., and still more preferably from 70° C. to 135° C. When the melting point is in this range, excellent heat resistance, impact resistance, adhesion, etc. are obtained.

The melting point can be obtained by measurement using, for example, "EXSTAR 6000" manufactured by Seiko Instruments, Inc., when the temperature is isothermally kept at 40° C. for one minute, increased from 40° C. to 160° C. at 10° C./min, isothermally kept at 160° C. for 10 minutes, decreased from 160° C. to 10° C. at 10° C./min, isothermally kept at 10° C. for 5 minutes, and then increased from 10° C. to 160° C. at 10° C./min.

(6) Polar Group-Containing Olefin Copolymer Production Method (6-1) Catalyst

The polar group-containing olefin copolymer of the present disclosure may be polymerized in the presence of a catalyst containing a transition metal, from the viewpoint of ring-opening the one or more monomers (B) selected from the group consisting of polar group-containing monomers represented by the general formula (1) and introducing them into the main chain of the polymer in one-step polymerization reaction, and from the viewpoint of making the molecular structure of the copolymer a linear molecular structure.

The catalyst containing a transition metal is not particularly limited, as long as it can ring-open the one or more monomers (B) selected from the group consisting of polar group-containing monomers represented by the general formula (1) and can polymerize the ring-opened monomer(s) (B) with the monomer(s) (A). As the catalyst containing a transition metal, examples include, but are not limited to, transition metal compounds of Groups 5 to 11 of the periodic table, which are compounds containing a chelating ligand.

Preferred transition metal examples include vanadium, niobium, tantalum, chromium, molybdenum, tungsten, manganese, iron, platinum, ruthenium, cobalt, rhodium, nickel, palladium and copper. Of them, preferred are transition metals of Groups 8 to 11 of the periodic table; more preferred are transition metals of Group 10 of the periodic table such as nickel, palladium and platinum; and particularly preferred are nickel (Ni) and palladium (Pd). These metals may be used solely or in combination of two or more kinds.

The chelating ligand contains at least two atoms selected from the group consisting of P, N, O and S. It includes a bidentate or multidentate ligand, and it is electrically neutral or anionic. Examples of the structure are illustrated in reviews by Brookhart, et al. (Chem. Rev., 2000, 100, 1169).

Preferred examples include a bidentate anionic P,O ligand such as phosphorus sulfonate, phosphorus carboxylate, phosphorus phenoxide, phosphorus alkoxide and phosphorus enolate, a bidentate anionic N,O ligand such as salicylaldiminato and pyridine carboxylate. Other preferred examples include a diimine ligand, a diphenoxide ligand and a diamide ligand.

From the viewpoint of polymer production efficiency, polymer molecular weight, and copolymerizability of the monomers (A) and (B), the catalyst containing a transition metal is preferably a catalyst containing a late transition metal selected from the group consisting of the transition metals of Groups 8 to 10 of the periodic table, more preferably a catalyst containing a transition metal of Group 10 of the periodic table, and still more preferably a catalyst containing a transition metal of Group 10 of the periodic table, which contains a chelating ligand containing, as a coordination site with the transition metal of Group 10 of the periodic table, one or more phosphorus atoms.

From the viewpoint of polymer production efficiency, polymer molecular weight, and copolymerizability of the monomers (A) and (B), the catalyst containing a transition metal is preferably a catalyst containing a transition metal of Group 10 of the periodic table, which is at least one selected from the group consisting of compounds represented by the following general formula (104):

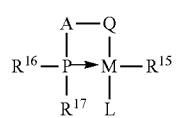

General Formula (104)

where M is a transition metal of Group 10 of the periodic table; Q is a divalent group shown in the brackets of A[—S(=O)$_2$—O—]M, A[—C(=O)—O—]M, A[—O—]M or A[—S—]M (A and M at the beginning and end of the formulae are described to show the binding direction of the groups); A is a divalent hydrocarbon group containing 1 to 30 carbon atoms, linking Q and the phosphorus atom, and optionally containing a functional group; L is a zero-valent ligand capable of leaving from the metal; $R^{15}$, $R^{16}$ and $R^{17}$ are each a hydrocarbon group containing 1 to 30 carbon atoms and optionally containing a functional group; $R^{15}$ and L optionally form a ring; $R^{16}$ and $R^{17}$ optionally form a ring; and $R^{16}$ or $R^{17}$ is optionally bound to A to form a ring.

In the general formula (104), M is a transition metal of Group 10 of the periodic table, and it is preferably Ni or Pd.

Q is a divalent group represented by —S(=O)$_2$—O—, —C(=O)—O—, —P(=O)(—OH)—O— or —S—, and it is a moiety where one electron coordinates to M. The left side of each formula is bound to A, and the right side is bound to M. Of them, —S(=O)$_2$—O— is particularly preferred from the viewpoint of catalytic activity.

A is a divalent hydrocarbon group containing 1 to 30 carbon atoms, linking Q and the phosphorus atom, and optionally containing a functional group.

The divalent hydrocarbon group containing 1 to 30 carbon atoms is preferably a divalent hydrocarbon group containing 1 to 12 carbon atoms. The divalent hydrocarbon group containing 1 to 30 carbon atoms is preferably an alkylene group and an arylene group, and particularly preferably an arylene group.

As the functional group of the hydrocarbon group as A, examples include, but are not limited to, a halogen atom, —OR$^\alpha$, —CO$_2$R$^\alpha$, —CO$_2$M', —CON(R$^\beta$)$_2$, —COR$^\alpha$, —SR$^\alpha$, —SO$_2$R$^\alpha$, —SOR$^\alpha$, —OSO$_2$R$^\alpha$, —PO(OR$^\alpha$)$_{2-y}$(R$^\beta$)$_y$, —CN, —NHR$^\alpha$, —N(R$^\alpha$)$_2$, —Si(OR$^\beta$)$_{3-x}$(R$^\beta$)$_x$, —OSi(OR$^\beta$)$_{3-x}$(R$^\beta$)$_x$, —NO$_2$, —SO$_3$M', —PO$_3$M'$_2$, —P(O)(OR$^\alpha$)$_2$M' and an epoxy-containing group (where R$^\beta$ is a hydrogen atom or a hydrocarbon group containing 1 to 20 carbon atoms; R$^\alpha$ is a hydrocarbon group containing 1 to 20 carbon atoms; M' is an alkali metal, an alkaline-earth metal, an ammonium, a quaternary ammonium or a phosphonium; x is an integer of from 0 to 3; and y is an integer of from 0 to 2).

As the hydrocarbon group containing 1 to 20 carbon atoms, examples include those exemplified above as R$^\alpha$ in the general formula (I).

As the divalent hydrocarbon group containing 1 to 30 carbon atoms as A, examples include the following formulae (a-1) to (a-7). In the following formulae, R$^{104}$s are each independently a hydrogen atom, a hydrocarbon group containing 1 to 30 carbon atoms, or a functional group. As the hydrocarbon group containing 1 to 30 carbon atoms as R$^{104}$, examples include those exemplified above as R$^\alpha$ in the general formula (I). The hydrocarbon group containing 1 to 30 carbon atoms is preferably a hydrocarbon group containing 1 to 20 carbon atoms, and more preferably a hydrocarbon group containing 1 to 10 carbon atoms.

From the viewpoint of catalytic activity, the divalent hydrocarbon group containing 1 to 30 carbon atoms as A is preferably the following formula (a-7).

(a-1)

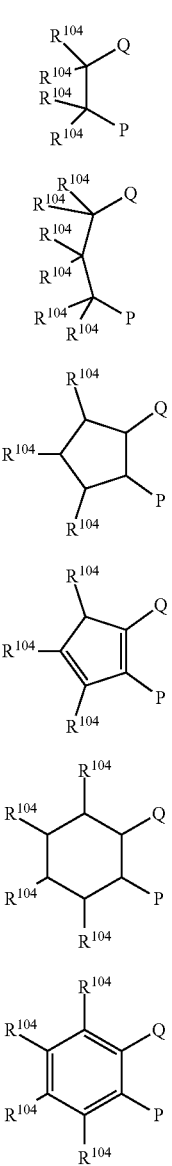

(a-2)
(a-3)
(a-4)
(a-5)
(a-6)
(a-7)

L is a zero-valent ligand capable of leaving from the metal.

L is preferably a compound which contains an electron donating group and which can be coordinated with the metal atom M to stabilize the metal complex. As L, a hydrocarbon compound containing 1 to 20 carbon atoms and containing oxygen, nitrogen or sulfur as coordinatable atoms, or a hydrocarbon compound containing a carbon-carbon unsaturated bond that can be coordinated with the transition metal (and optionally containing a heteroatom) may be used. The number of the carbon atoms of L is preferably from 1 to 16, and more preferably from 1 to 10.

As L, preferred examples include, but are not limited to, pyridines, piperidines, alkyl ethers, aryl ethers, alkyl aryl ethers, cyclic ethers, an alkyl nitrile derivative, an aryl nitrile derivative, alcohols, amides, aliphatic esters, aromatic esters, amines, and cyclic unsaturated hydrocarbons.

As L containing a sulfur atom, examples include dimethyl sulfoxide (DMSO). As L containing a nitrogen atom, examples include, but are not limited to, trialkylamine containing 1 to 10 carbon atoms in an alkyl group, dialkylamine containing 1 to 10 carbon atoms in an alkyl group, pyridine, 2,6-dimethylpyridine (also known as 2,6-lutidine), aniline, 2,6-dimethylaniline, 2,6-diisopropylaniline, N,N,N',N'-tetramethylethylenediamine (TMEDA), 4-(N,N-dimethylamino)pyridine (DMAP), acetonitrile, benzonitrile, quinoline and 2-methylquinoline. As L containing an oxygen atom, examples include diethyl ether, tetrahydrofuran and 1,2-dimethoxyethane. From the viewpoint of the stability and catalytic activity of the complex, dimethyl sulfoxide (DMSO), pyridine, 2,6-dimethylpyridine (also known as 2,6-lutidine) and N,N,N',N'-tetramethylethylenediamine (TMEDA) are preferred, and dimethyl sulfoxide (DMSO) and 2,6-dimethylpyridine (also known as 2,6-lutidine) are more preferred.

$R^{15}$ and L may form a ring. An example thereof is a cycloocta-1-enyl group, which is also a preferred embodiment in the present disclosure.

$R^{15}$, $R^{16}$ and $R^{17}$ are each a hydrocarbon group containing 1 to 30 carbon atoms and optionally containing a functional group.

As the hydrocarbon group containing 1 to 30 carbon atoms as $R^{15}$, $R^{16}$ and $R^{17}$, examples include those exemplified above as $R^a$ in the general formula (I).

The functional group in $R^{15}$, $R^{16}$ and $R^{17}$ may be the same as the functional group in A.

$R^{15}$ is preferably a hydrocarbon group containing 1 to 20 carbon atoms, a halogen-substituted hydrocarbon group containing 1 to 20 carbon atoms, or a hydrocarbon group containing 1 to 20 carbon atoms and being substituted with an alkoxy group or an aryloxy group. The number of the carbon atoms of the hydrocarbon group is more preferably from 1 to 10. In particular, $R^{15}$ is more preferably an alkyl group containing 1 to 3 carbon atoms, a benzyl group, a trifluoromethyl group, a pentafluorophenyl group, a 1-(methoxymethyl)ethyl group, a 1-(ethoxymethyl)ethyl group, a 1-(phenoxymethyl)ethyl group, or a 1-(2,6-dimethylphenoxymethyl)ethyl group, and $R^{15}$ is still more preferably a methyl group or a benzyl group.

$R^{16}$ and $R^{17}$ are located in the neighborhood of the transition metal M, and they sterically and/or electronically exert an interaction on the transition metal M. To exert such an effect, $R^{16}$ and $R^{17}$ are preferably bulky. The number of the carbon atoms of $R^{16}$ and $R^{17}$ is preferably from 3 to 30, and more preferably from 6 to 20.

$R^{16}$ and $R^{17}$ are each preferably an alkyl group containing 3 to 10 carbon atoms and optionally containing a functional group, a cycloalkyl group containing 6 to 20 carbon atoms and optionally containing a functional group, or an aryl group containing 6 to 20 carbon atoms and optionally containing a functional group.

The alkyl group containing 3 to 10 carbon atoms as $R^{16}$ and $R^{17}$ is preferably an n-propyl group, an isopropyl group, an n-butyl group, an isobutyl group, a sec-butyl group or a t-butyl group.

As the cycloalkyl group containing 6 to 20 carbon atoms and optionally containing a functional group as $R^{16}$ and $R^{17}$, examples include, but are not limited to, a cyclohexyl group, a cycloheptyl group and a cyclooctyl group, all of which optionally contain a functional group and optionally are substituted with a linear or branched alkyl group containing 3 to 10 carbon atoms.

The cycloalkyl group may be the cycloalkyl group described in paragraphs 0104 to 0113 in JP-A No. 2018-141138 (X in the paragraphs 0104 to 0113 in JP-A No. 2018-141138 indicates the binding site of P (a phosphorus atom) in the general formula (104) of the present disclosure).

From the viewpoint of polymer molecular weight control and polar monomer copolymerizability control, $R^{16}$ and $R^{17}$ are preferably a cyclohexyl group optionally being substituted with a linear or branched alkyl group containing 3 to 10 carbon atoms, and more preferably a cyclohexyl group being substituted with a linear or branched alkyl group containing 3 to 10 carbon atoms. $R^{16}$ and $R^{17}$ are more preferably a 2-isopropyl-5-methylcyclohexyl group (a menthyl group).

As the aryl group containing 6 to 20 carbon atoms and optionally containing a functional group as $R^{16}$ and $R^{17}$, examples include, but are not limited to, a phenyl group, a naphthyl group and an anthracenyl group, all of which optionally contain a functional group and optionally are substituted with a linear or branched alkyl group containing 3 to 10 carbon atoms. The aryl group containing 6 to 20 carbon atoms is preferably substituted with a group containing at least one of an oxygen atom and a nitrogen atom. When the aryl group containing 6 to 20 carbon atoms is substituted with a group containing at least one of an oxygen atom and a nitrogen atom, the functional group is preferably substituted at the ortho position with respect to carbon bound to phosphorus, because, as a result, at least one of the oxygen atom and nitrogen atom in $R^{16}$ and $R^{17}$ can be spatially arranged so as to possess an interaction with the transition metal M.

As $R^{16}$ and $R^{17}$, preferred examples include, but are not limited to, a 2,6-dimethoxyphenyl group, a 2,4,6-trimethoxyphenyl group, a 4-methyl-2,6-dimethoxyphenyl group, a 4-t-butyl-2,6-dimethoxyphenyl group, a 1,3-dimethoxy-2-naphthyl group, a 2,6-diethoxyphenyl group, a 2,4,6-triethoxyphenyl group, a 4-methyl-2,6-diethoxyphenyl group, a 4-t-butyl-2,6-diethoxyphenyl group, a 1,3-diethoxy-2-naphthyl group, a 2,6-diphenoxyphenyl group, a 2,4,6-triphenoxyphenyl group, a 4-methyl-2,6-diphenoxyphenyl group, a 4-t-butyl-2,6-diphenoxyphenyl group, a 1,3-diphenoxy-2-naphthyl group, a 2,6-dimethoxymethylphenyl group, a 2,4,6-trimethoxymethylphenyl group, a 4-methyl-2,6-dimethoxymethylphenyl group, a 4-t-butyl-2,6-dimethoxymethylphenyl group, a 1,3-dimethoxymethyl-2-naphthyl group, a 2,6-diphenoxymethylphenyl group, a 2,4,6-triphenoxymethylphenyl group, a 4-methyl-2,6-diphenoxymethylphenyl group, a 4-t-butyl-2,6-diphenoxymethylphenyl group, a 1,3-diphenoxymethyl-2-naphthyl group, a 2,6-di(2-methoxyethyl)phenyl group, a 2,4,6-tri(2-methoxyethyl)phenyl group, a 4-methyl-2,6-di(2-methoxyethyl)phenyl group, a 4-t-butyl-2,6-di(2-methoxyethyl)phenyl group, a 1,3-di(2-methoxyethyl)-2-naphthyl group, a 2,6-di(2-phenoxyethyl)phenyl group, a 2,4,6-tri(2-phenoxyethyl)phenyl group, a 4-methyl-2,6-di(2-phenoxyethyl)phenyl group, a 4-t-butyl-2,6-di(2-phenoxyethyl)phenyl group, and a 1,3-di(2-phenoxyethyl)-2-naphthyl group.

$R^{16}$ or $R^{17}$ may be bound to A to form a ring structure. As the ring structure, examples include the structures described in paragraphs 0120 and 0121 in JP-A No. 2018-141138 (these examples indicate the case where the substituent $R^{16}$ and A are bound to form a ring structure, and P and Q are the same as those shown in the general formula (104) of the present disclosure).

Among the compounds represented by the general formula (104) of the present disclosure, the compound represented by the following general formula (105) is preferred from the viewpoint of polymer production efficiency:

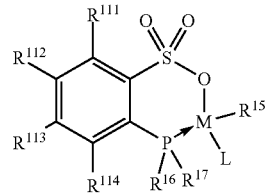

General Formula (105)

where M, L, $R^{15}$, $R^{16}$ and $R^{17}$ are the same as those of the general formula (104), and $R^{111}$, $R^{112}$, $R^{113}$ and $R^{114}$ are each independently a hydrogen atom, a hydrocarbon group containing 1 to 30 carbon atoms or a functional group.

In the general formula (105), the hydrocarbon group containing 1 to 30 carbon atoms and the functional group as $R^{111}$, $R^{112}$, $R^{113}$ and $R^{114}$ may be the same as those described above for A.

Of them, $R^{111}$ tends to give a high-molecular-weight polymer when it is bulky, and a functional group such as a t-butyl group, a trimethylsilyl group, a phenyl group, a 9-anthracenyl group, a 4-t-butylphenyl group, a 2,4-di-t-butylphenyl group and a pentafluorophenyl group may be appropriately selected.

The transition metal complex used in the present disclosure can be prepared by a conventionally known method.

The catalyst containing a transition metal used in the present disclosure, is a catalyst which contains, as a main catalyst component, the above-described transition metal complex. As needed, it may be used in combination with an activator, a carrier, etc. As the activator, examples include alkylalumoxane, which is a promoter used in metallocene catalyst, and a boron-containing compound.

As the carrier, any carrier can be used as long as it does not depart from the gist of the present invention. In general, an inorganic oxide or a polymer carrier is preferably used. As the carrier, examples include, but are not limited to, $SiO_2$, $Al_2O_3$, MgO, $ZrO_2$, $TiO_2$, $B2O_3$, CaO, ZnO, BaO, $ThO_2$, and mixtures thereof. Also, a mixed oxide such as $SiO_2$—$Al_2O_3$, $SiO_2$—$V_2O_5$, $SiO_2$—$TiO_2$, $SiO_2$—MgO and $SiO_2$—$Cr_2O_3$ can be used. Also, inorganic silicate, a polyethylene carrier, a polypropylene carrier, a polystyrene carrier, a polyacrylic acid carrier, a polymethacrylic acid carrier, a polyacrylic acid ester carrier, a polyester carrier, a polyamide carrier, a polyimide carrier and the like can be used. For these carriers, the particle diameter, particle size distribution, pore volume, specific surface area and so on are not particularly limited, and any carrier can be used.

(6-2) Polar Group-Containing Olefin Copolymer Polymerization Method

In the present disclosure, the method for polymerizing the polar group-containing olefin copolymer is not particularly limited.

For example, solution polymerization in which all of the produced polymer is dissolved in a medium, slurry polymerization in which at least a part of the produced polymer is made into slurry in a medium, bulk polymerization in which a liquefied monomer itself is used as a medium, or high-pressure ion polymerization in which at least a part of the produced polymer is dissolved in a monomer liquefied at high temperature and high pressure, may be used.

The polymerizing method may be any of batch polymerization, semi-batch polymerization and continuous polymerization.

Detailed production processes and conditions are disclosed in JP-A Nos. 2010-260913 and 2010-202647, for example.

An unreacted monomer and the medium may be separated from the produced polymer, recycled and used. In the recycling process, the monomer and the medium may be purified and reused, or they may be reused without purification. Conventionally-known methods may be used for separation of the unreacted monomer and the medium from the produced polymer, such as filtration, centrifugal separation, solvent extraction, and reprecipitation using a poor solvent.

The copolymerization temperature, copolymerization pressure and copolymerization time are not particularly limited. In general, they may be appropriately set in the following ranges, considering productivity and process capability.

The copolymerization temperature is in a range of generally from −20° C. to 290° C., preferably from 0° C. to 250° C., more preferably from 0° C. to 200° C., still more preferably from 10° C. to 150° C., and particularly preferably from 20° C. to 100° C. The copolymerization pressure is in a range of generally from 0.1 MPa to 100 MPa, preferably from 0.3 MPa to 90 MPa, more preferably from 0.5 MPa to 80 MPa, still more preferably from 1.0 MPa to 70 MPa, and particularly preferably from 1.3 MPa to 60 MPa. The copolymerization time is in a range of generally from 0.1 minute to 50 hours, preferably from 0.5 minute to 40 hours, and more preferably from one minute to 30 hours.

In the present invention, the polymerization is generally carried out in an inert gas atmosphere. For example, a nitrogen or argon atmosphere is used, and a nitrogen atmosphere is preferably used.

The supply of the catalyst and monomers to a polymerization reactor is not particularly limited. Various supplying methods are available depending on the purpose. For example, in the case of batch polymerization, the following method can be employed: the monomers in predetermined amounts are supplied to a copolymerization reactor in advance, and then the catalyst is supplied thereto. In this case, an additional monomer and an additional catalyst may be supplied to the copolymerization reactor. In the case of continuous polymerization, the following method can be employed: the monomers and catalyst in predetermined amounts are continuously or intermittently supplied to a copolymerization reactor to continuously carry out a copolymerization reaction.

For controlling the composition of the copolymer, a method for controlling the composition by changing the ratio of the supplied monomers, can be generally employed. Also, a method for controlling the copolymer composition by utilizing a difference in monomer reactivity ratio, which is due to a difference in catalyst structure, may be employed, or a method for controlling the copolymer composition by utilizing the polymerization temperature dependence of the monomer reactivity ratio, may be employed.

For the control of the molecular weight of the copolymer, a conventionally-known method can be employed, such as a method for controlling the molecular weight by controlling the polymerization temperature, a method for controlling the molecular weight by controlling the monomer concentration, and a method for controlling the molecular weight by controlling the ligand structure in the transition metal complex.

EXAMPLES

Hereinafter, the present disclosure will be described in more detail, with reference to examples and comparative examples. The present disclosure is not limited to these examples, as long as it does not depart from the gist of the present invention. The physical properties and so on of the polar group-containing olefin copolymer and so on were measured by the following method.

[Structure of the Polar Group-Containing Olefin Copolymer]

The structure of the polar group-containing olefin copolymer was determined by $^1$H-NMR and $^{13}$C-NMR analysis using ASCEND 500 manufactured by BRUKER or AVANCE 400 manufactured by BRUKER.

The NMR measurement was carried out at 120° C. in the following conditions: 1,1,2,2-tetrachloroethane-d2 was used as the solvent; the polymer concentration for the $^1$H-NMR measurement was 5 mass %; and the polymer concentration for the $^{13}$C-NMR measurement was 15 mass %. Or, a part of the NMR measurement was carried out at 120° C. with a uniform solution in which about 150 mg of the polar group-containing olefin copolymer was dissolved by heating in 2.4 mL of a mixed solvent (1,2-dichlorobenzene:bromobenzene-d5=1:2).

The $^{13}$C-NMR was measured using chromium(III) acetylacetonate as a relaxation reagent and using an inverse-gated decoupling method (a 90° pulse of 9.0 microseconds, spectral width: 31 kHz, relaxation time: 10 seconds, acquisition time: 10 seconds, and accumulated number of times of FID: 5,000 to 10,000), and then quantitative analysis was performed. Or, a part of the $^{13}$C-NMR was measured using an inverse-gated decoupling method (a 90° pulse of 15.8 microseconds, spectral width: 25 kHz, relaxation time: 50 seconds, acquisition time: 1.5 seconds, and accumulated number of times of FID: 1,024), and then quantitative analysis was performed.

Number Average Molecular Weight and Weight Average Molecular Weight

The number average molecular weight and the weight average molecular weight were calculated using high-temperature GPC device HLC-8321GPC/HT manufactured by Tosoh Corporation, which was equipped with TSKgel GMHHR-H(S)HT columns manufactured by Tosoh Corporation (two 7.8 mm I.D.×30 cm columns in series), by size exclusion chromatography in which polystyrene was used as a standard substance for molecular weight (solvent: 1,2-dichlorobenzene, temperature: 145° C.), or the number average molecular weight and the weight average molecular weight were calculated using high-temperature GPC device ALC/GPC 150C manufactured by Waters Corporation, which was equipped with AT-806MS columns manufactured by Showa Denko K. K. (three 8.0 mm I.D.×25 cm columns in series), by size exclusion chromatography in which polystyrene was used as a standard substance for molecular weight (solvent: 1,2-dichlorobenzene, temperature: 140° C.).

Synthesis of the Transition Metal Complex

Synthesis Example 1

A transition metal complex (A) represented by the following chemical formula (A) (where both Rs are menthyl (2-isopropyl-5-methylcyclohexyl) and Lut is 2,6-dimethylpyridine) was synthesized as described in JP-A No. 2017-031300.

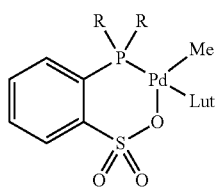

Chemical Formula (A)

Synthesis Example 2

A transition metal complex (B) represented by the chemical formula (A) (where both Rs are cyclohexyl and Lut is 2,6-dimethylpyridine) was synthesized as described in JP-A No. 2011-068881.

Synthesis Example 3

A transition metal complex (C) represented by the chemical formula (A) (where both Rs are isopropyl and Lut is 2,6-dimethylpyridine) was synthesized as described in JP-A No. 2013-079347.

Synthesis Example 4

A transition metal complex (D) represented by the chemical formula (A) (where both Rs are 2-methoxyphenyl and Lut is 2,6-dimethylpyridine) was synthesized as described in JP-A No. 2007-046032.

Example 1

In a nitrogen atmosphere, the transition metal complex (A) (6.9 mg, 0.010 mmol) as the catalyst, toluene (10 mL) as the solvent, and 2,3-diphenylcyclopropen-1-one (206.1 mg, 1.0 mmol) as the monomer (B) were added in a 50 mL autoclave in sequence. While the autoclave was pressurized with ethylene (the monomer (A)) (3.0 MPa), the mixture was stirred at a reaction temperature of 80° C. for 12 hours. The autoclave was returned to room temperature, and methanol (20 mL) was added. A solid thus precipitated was recovered by filtration, washed with methanol, and then dried under reduced pressure. A polar group-containing olefin polymer 1 thus obtained was 2035 mg.

Figure 1:
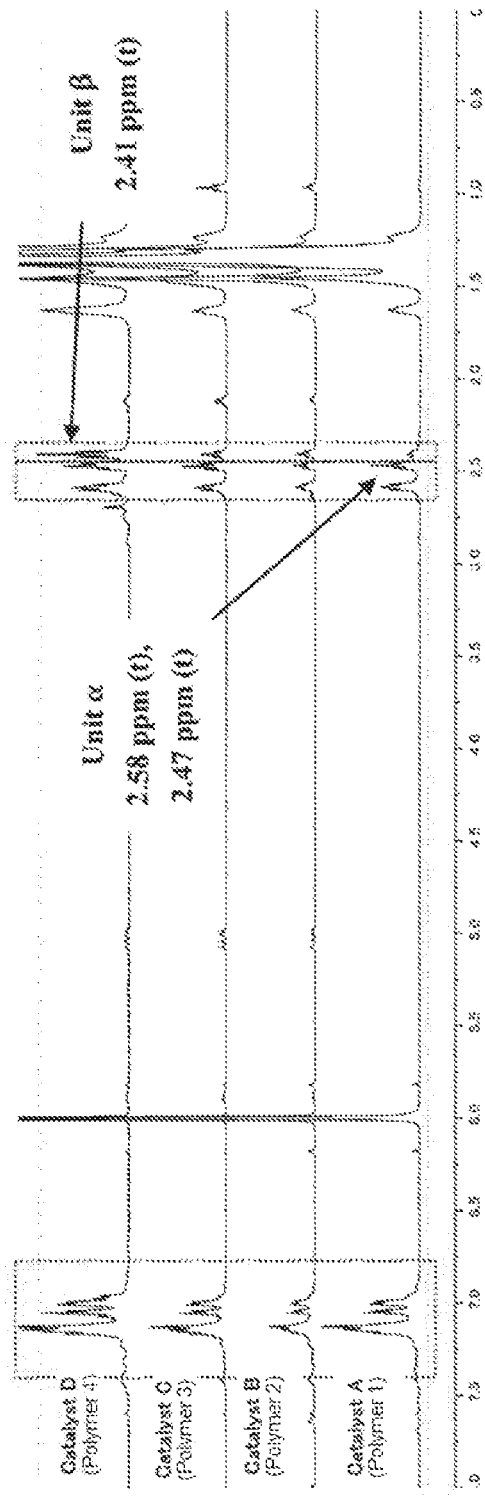
FIG. 1 shows the $^1$H-NMR measurement results of the polar group-containing olefin copolymers 1 to 4 of Examples 1 to 4.
Figure 2:
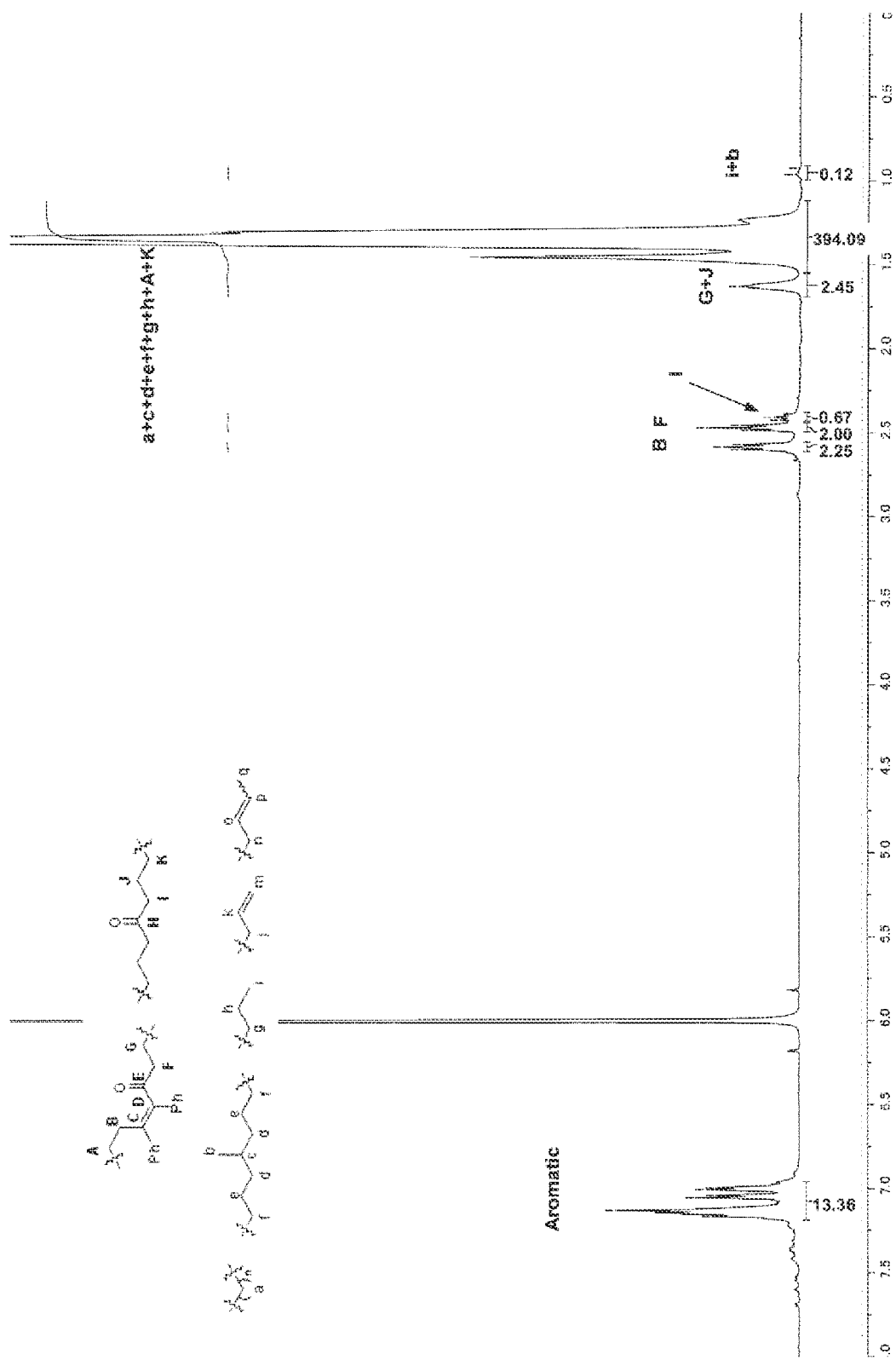
FIG. 2 shows the $^1$H-NMR measurement result of the polar group-containing olefin copolymer 1 of Example 1.
Figure 3:
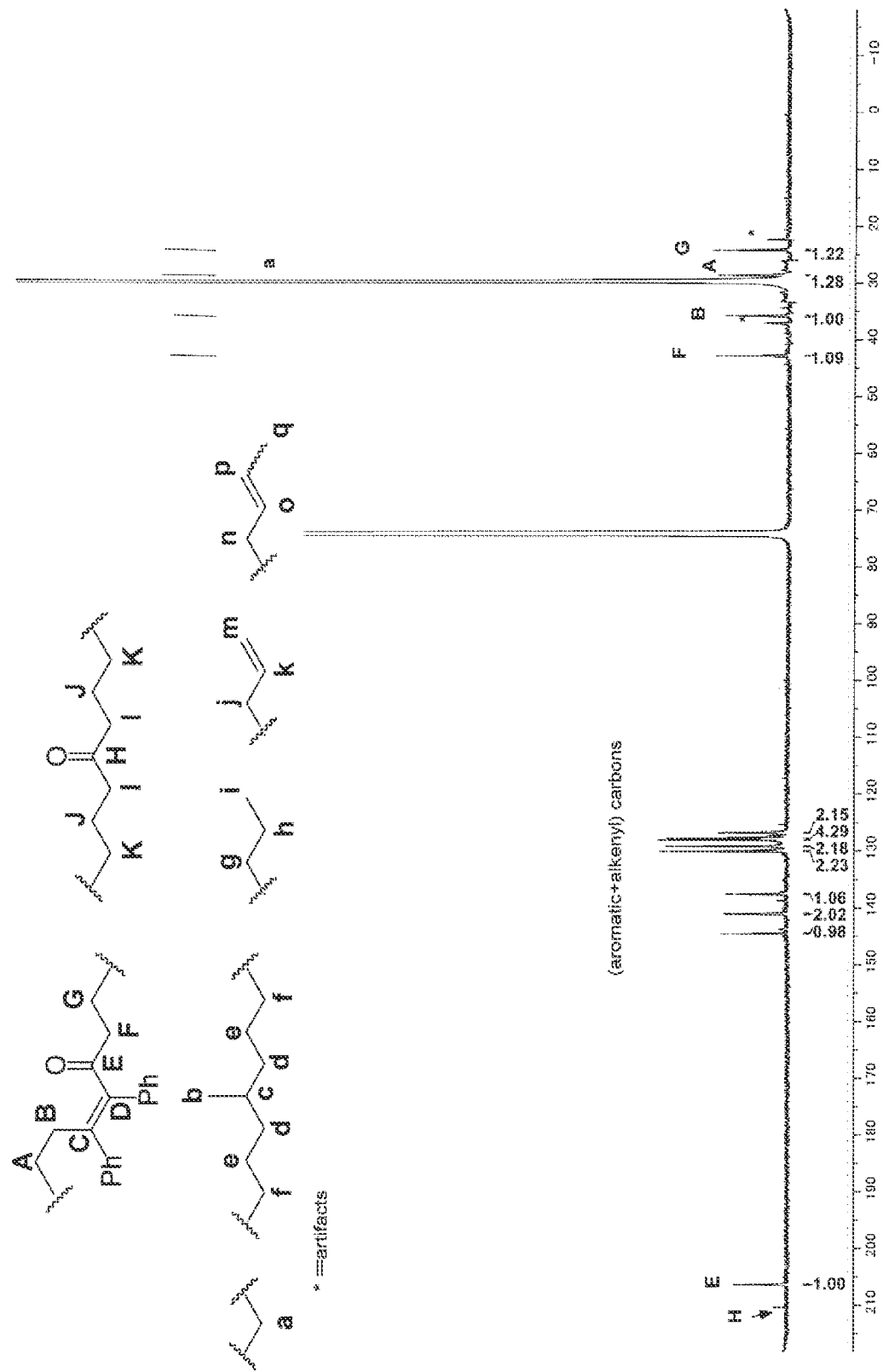
FIG. 3 shows the $^{13}$C-NMR measurement result of the polar group-containing olefin copolymer 1 of Example 1.
Figure 4:
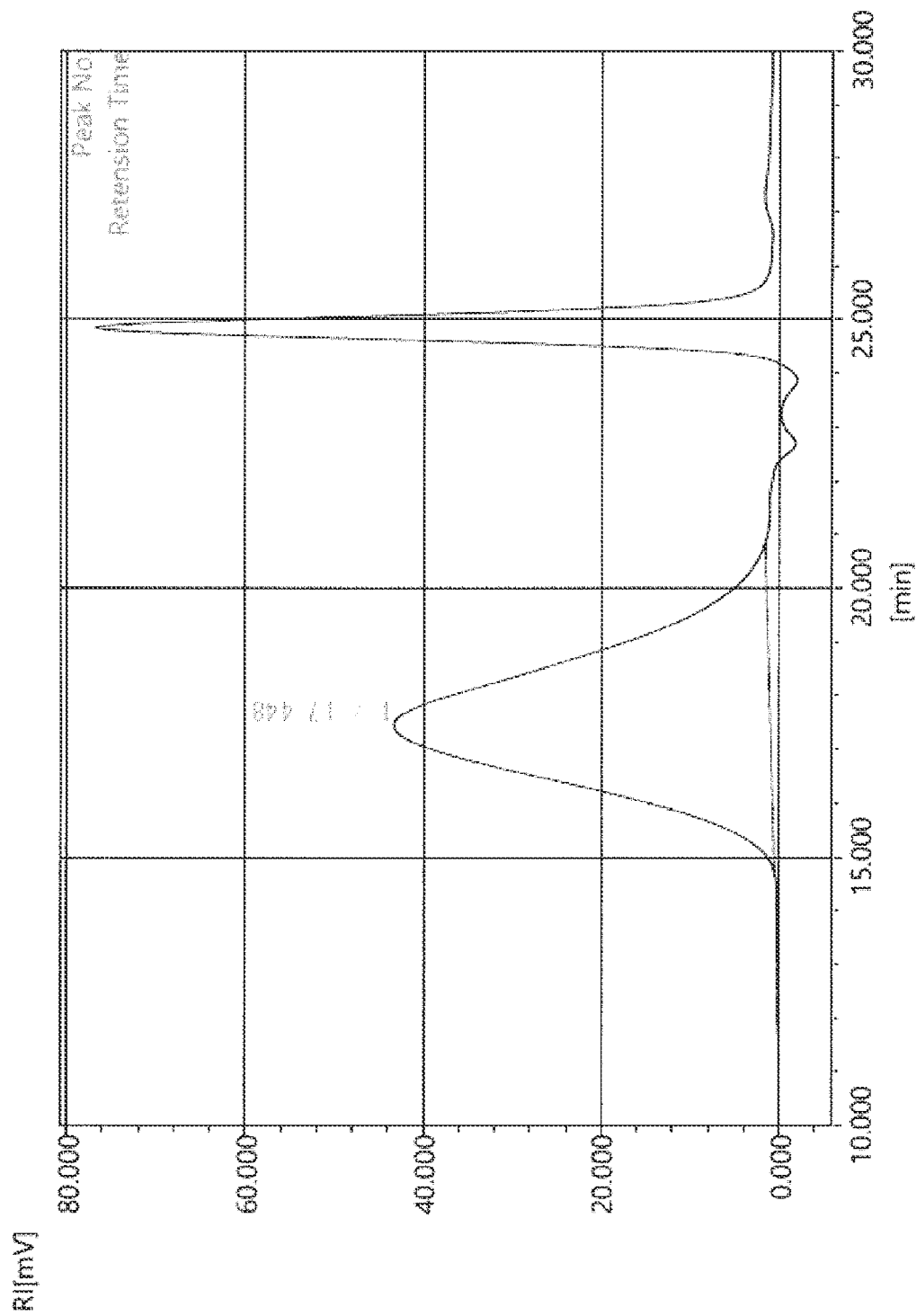
FIG. 4 shows the GPC chart of the polar group-containing olefin copolymer 1 of Example 1.
Figure 5:
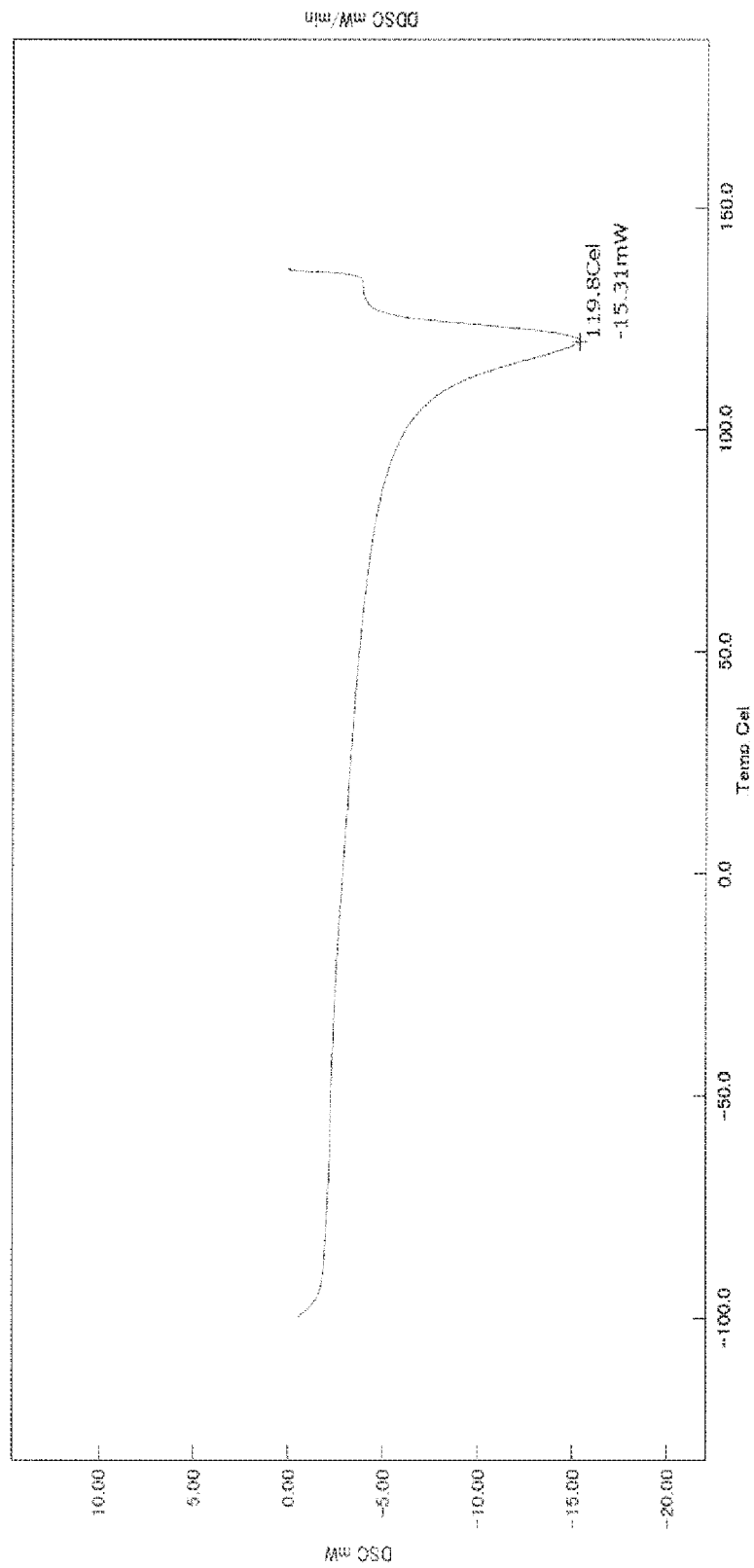
FIG. 5 shows the DSC chart of the polar group-containing olefin copolymer 1 of Example 1.

The polymerization conditions are shown in Table 1, and the results of various analyses of the polar group-containing olefin polymer 1 are shown in Table 2. FIG. 1 shows the $^1$H-NMR spectrum of the obtained polymer 1. FIG. 2 is a partially enlarged view (8.00 ppm to 0 ppm) of the $^1$H-NMR spectrum of the polymer 1. FIG. 3 shows the 13C-NMR spectrum of the polymer 1. FIG. 4 shows the GPC chart of the polymer 1. FIG. 5 shows the DSC chart of the polymer 1.

Example 2

Example 2 was carried out in the same manner as Example 1, except that the catalyst was changed to the transition metal complex (B) (5.8 mg, 0.010 mmol). A polar group-containing olefin polymer 2 thus obtained was 976 mg.

The results of various analyses of the polar group-containing olefin polymer 2 are shown in Table 2. FIG. 1 shows the $^1$H-NMR spectrum of the obtained polymer 2.

Example 3

Example 3 was carried out in the same manner as Example 1, except that the catalyst was changed to the transition metal complex (C) (5.0 mg, 0.010 mmol). A polar group-containing olefin polymer 3 thus obtained was 1420 mg.

The results of various analyses of the polar group-containing olefin polymer 3 are shown in Table 2. FIG. 1 shows the $^1$H-NMR spectrum of the obtained polymer 3.

Example 4

Example 4 was carried out in the same manner as Example 1, except that the catalyst was changed to the transition metal complex (D) (6.3 mg, 0.010 mmol). A polar group-containing olefin polymer 4 thus obtained was 526 mg.

The results of various analyses of the polar group-containing olefin polymer 4 are shown in Table 2. FIG. 1 shows the $^1$H-NMR spectrum of the obtained polymer 4.

Example 5

Example 5 was carried out in the same manner as Example 1, except that the reaction temperature was changed to 60° C. A polar group-containing olefin polymer 5 thus obtained was 896 mg.

The results of various analyses of the polar group-containing olefin polymer 5 are shown in Table 2.

Example 6

Example 6 was carried out in the same manner as Example 1, except that the reaction temperature was changed to 120° C. A polar group-containing olefin polymer 6 thus obtained was 1446 mg.

The results of various analyses of the polar group-containing olefin polymer 6 are shown in Table 2.

Example 7

Example 7 was carried out in the same manner as Example 1, except that the ethylene pressure was changed to 1 MPa. A polar group-containing olefin polymer 7 thus obtained was 275 mg.

The results of various analyses of the polar group-containing olefin polymer 7 are shown in Table 2.

Example 8

Example 8 was carried out in the same manner as Example 1, except that the monomer (B) was changed to 2,3-diphenylcyclopropen-1-one (1030.5 mg, 5.0 mmol). A polar group-containing olefin polymer 8 thus obtained was 408 mg.

The results of various analyses of the polar group-containing olefin polymer 8 are shown in Table 2.

Example 9

Example 9 was carried out in the same manner as Example 1, except that the monomer (B) was changed to 2,3-di(4-methoxyphenyl)cyclopropen-1-one (266.3 mg, 1.0 mmol). A polar group-containing olefin polymer 9 thus obtained was 436 mg.

Figure 6:
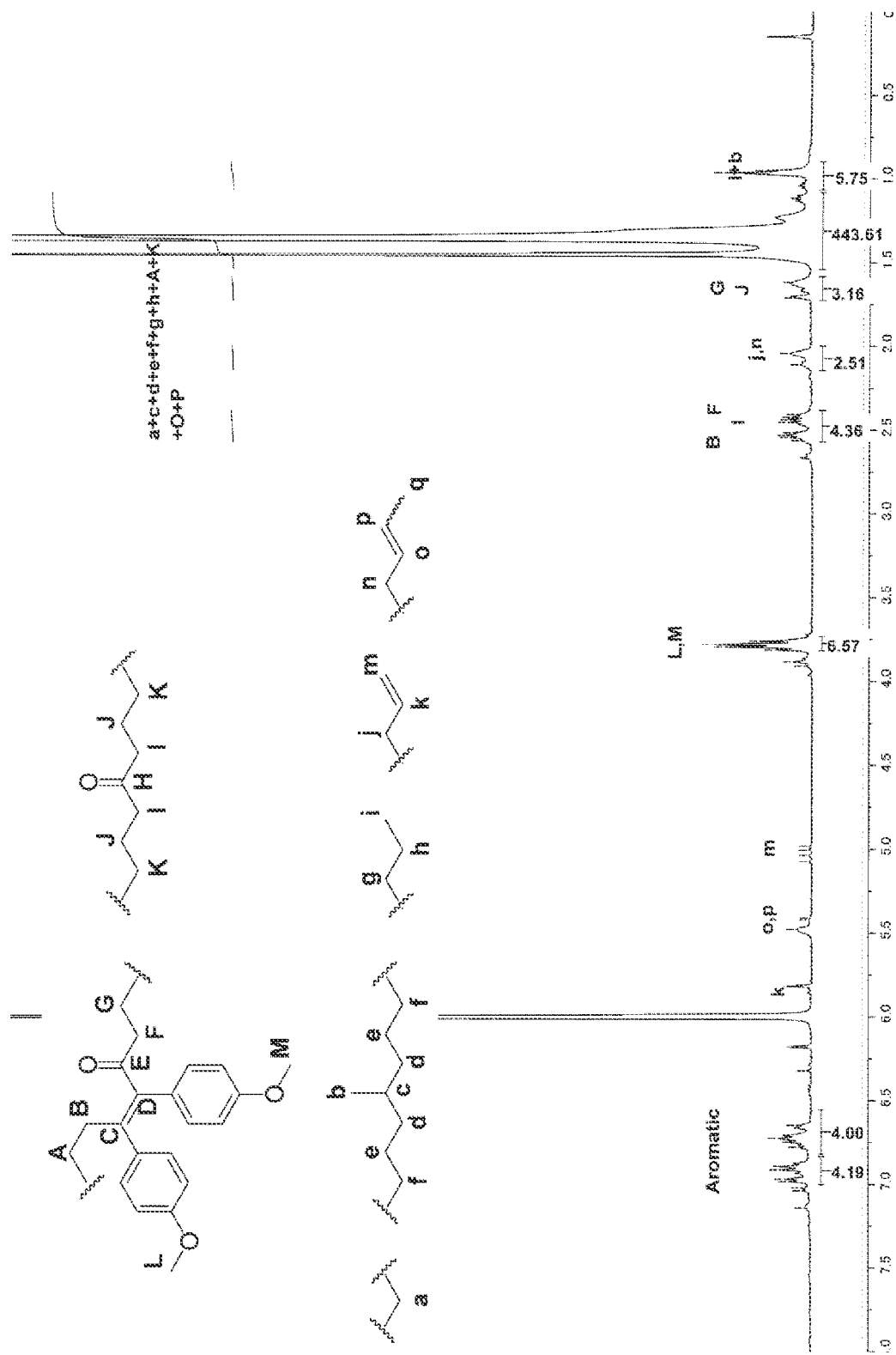
FIG. 6 shows the $^1$H-NMR measurement result of the polar group-containing olefin copolymer 9 of Example 9.

The results of various analyses of the polar group-containing olefin polymer 9 are shown in Table 2. FIG. 6 shows the $^1$H-NMR spectrum of the obtained polymer 9.

Example 10

Example 10 was carried out in the same manner as Example 1, except that the monomer (B) was changed to 2,3-di(4-bromophenyl)cyclopropen-1-one (364.0 mg, 1.0 mmol). A polar group-containing olefin polymer 10 thus obtained was 1467 mg.

Figure 7:
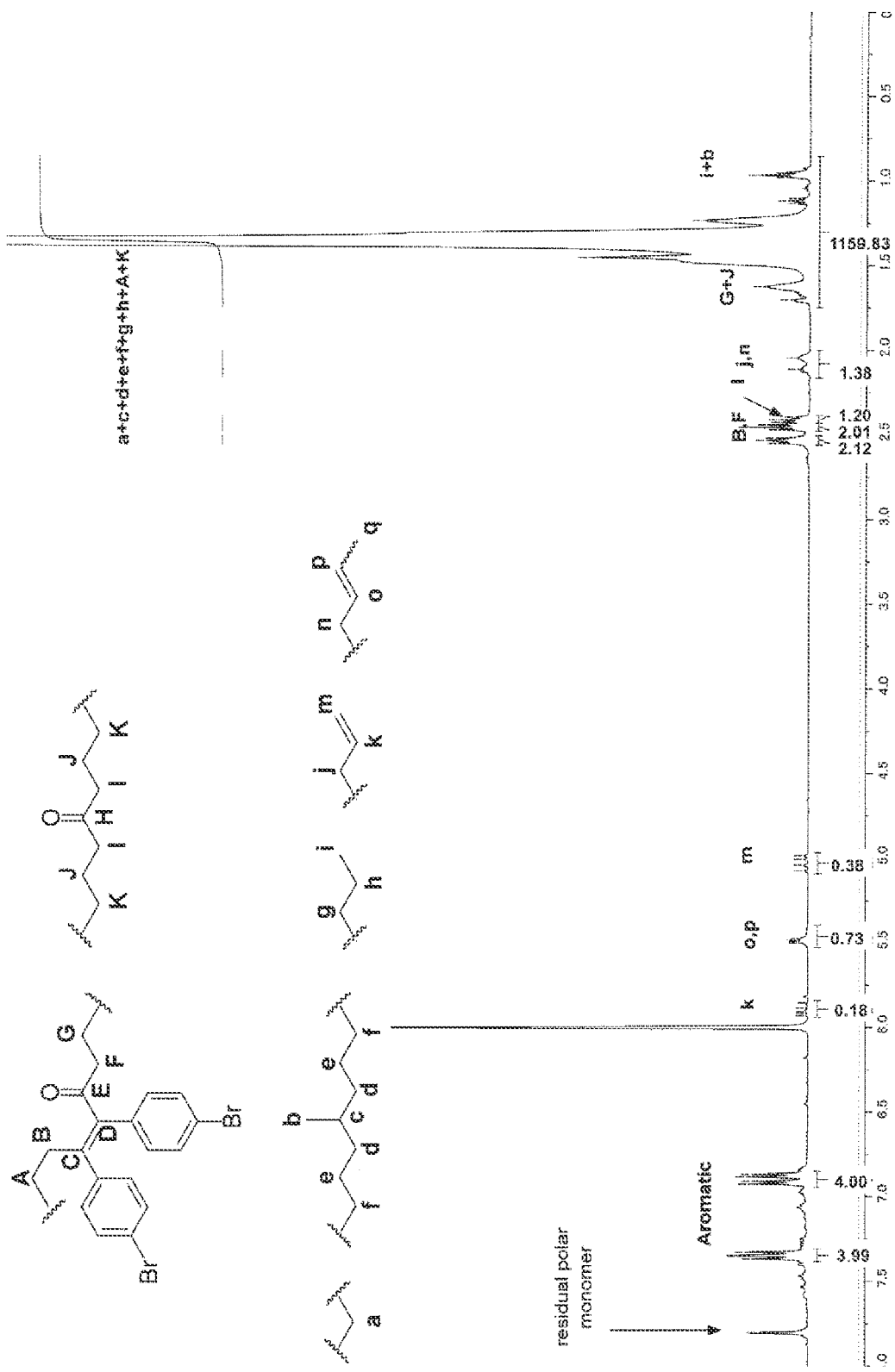
FIG. 7 shows the $^1$H-NMR measurement result of the polar group-containing olefin copolymer 10 of Example 10.

The results of various analyses of the polar group-containing olefin polymer 10 are shown in Table 2. FIG. 7 shows the $^1$H-NMR spectrum of the obtained polymer 10.

Example 11

Example 11 was carried out in the same manner as Example 1, except that the monomer (B) was changed to 2,3-diethylcyclopropen-1-one (110.1 mg, 1.0 mmol). A polar group-containing olefin polymer 11 thus obtained was 479 mg.

Figure 8:
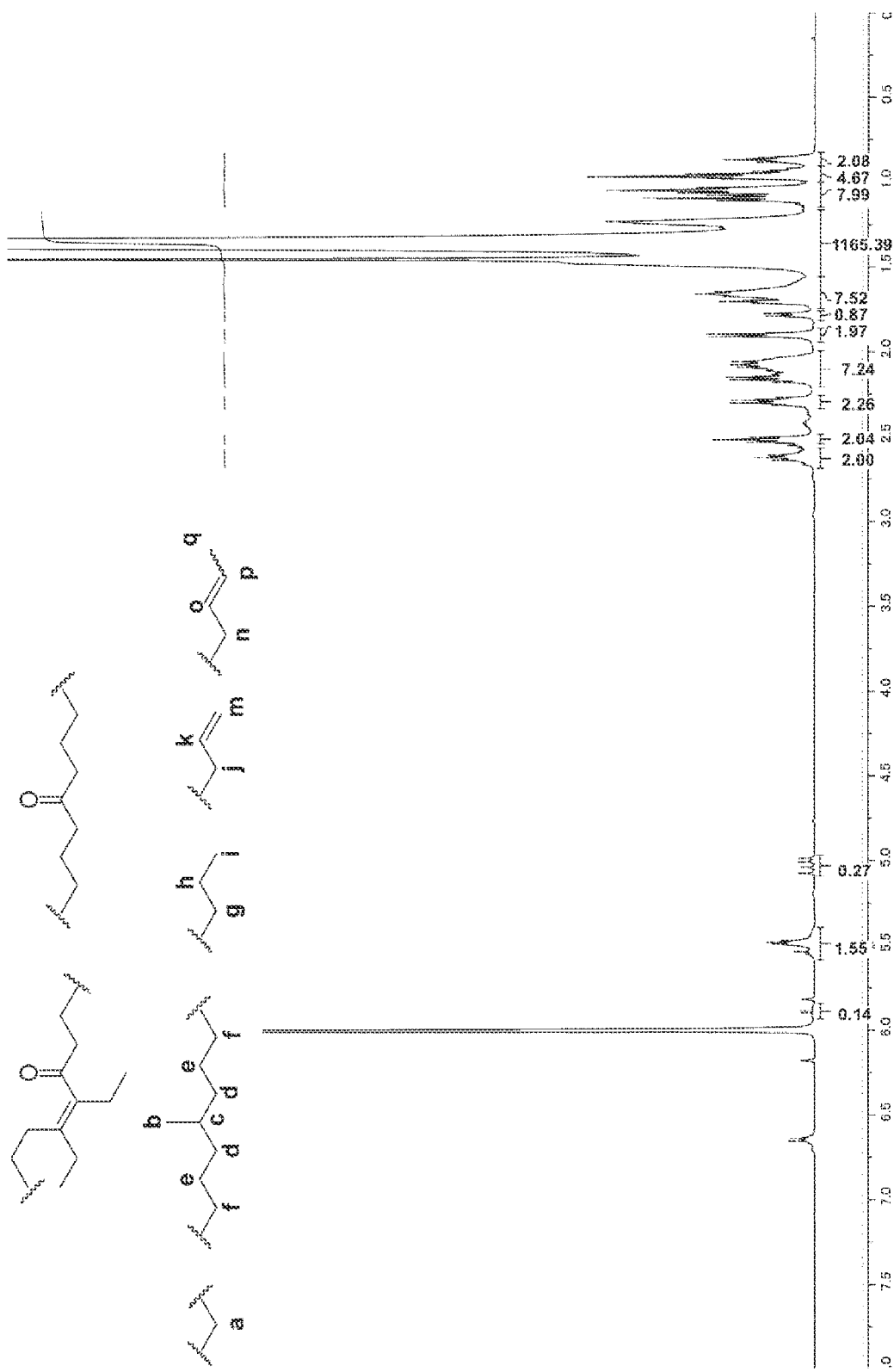
FIG. 8 shows the $^1$H-NMR measurement result of the polar group-containing olefin copolymer 11 of Example 11.

The results of various analyses of the polar group-containing olefin polymer 11 are shown in Table 2. FIG. 8 shows the $^1$H-NMR spectrum of the obtained polymer 11.

Example 12

Example 12 was carried out in the same manner as Example 1, except that allyl acetate (1852.2 mg, 18.5 mmol) was further added as the monomer (C). A polar group-containing olefin polymer 12 thus obtained was 206 mg.

Figure 9:
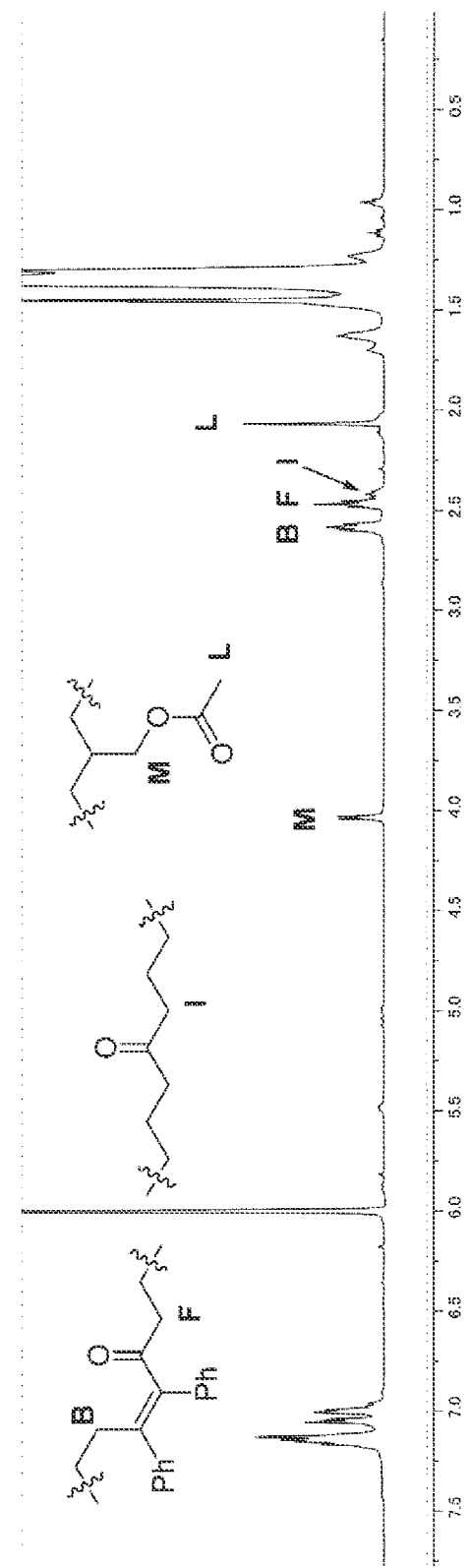
FIG. 9 shows the $^1$H-NMR measurement result of the polar group-containing olefin copolymer 12 of Example 12.

The results of various analyses of the polar group-containing olefin polymer 12 are shown in Table 2. FIG. 9 shows the $^1$H-NMR spectrum of the obtained polymer 12.

Example 13

In a nitrogen atmosphere, toluene (400 mL) as the solvent and 3-ethyl-2-phenylcyclopropen-1-one (3.12 g, 20 mmol) as the monomer (B) were added in a 2.4 L autoclave in sequence. The autoclave was pressurized with ethylene (the monomer (A)) (3.0 MPa); the transition metal complex (A) (278 mg, 0.40 mmol) as the catalyst was added; and the mixture was stirred at a reaction temperature of 80° C. for 1 hour. A toluene solution of 1,2-butanediol (1 M, 10 mL) was added; the autoclave was returned to room temperature; and EKINEN (trade name) F-1 (manufactured by Japan Alcohol Trading Co., Ltd., 500 mL) was added. A solid thus precipitated was recovered by filtration, washed with EKINEN (trade name) F-1 (500 mL×2), and then dried under reduced pressure. A polar group-containing olefin polymer 13 thus obtained was 3720 mg.

Figure 10:
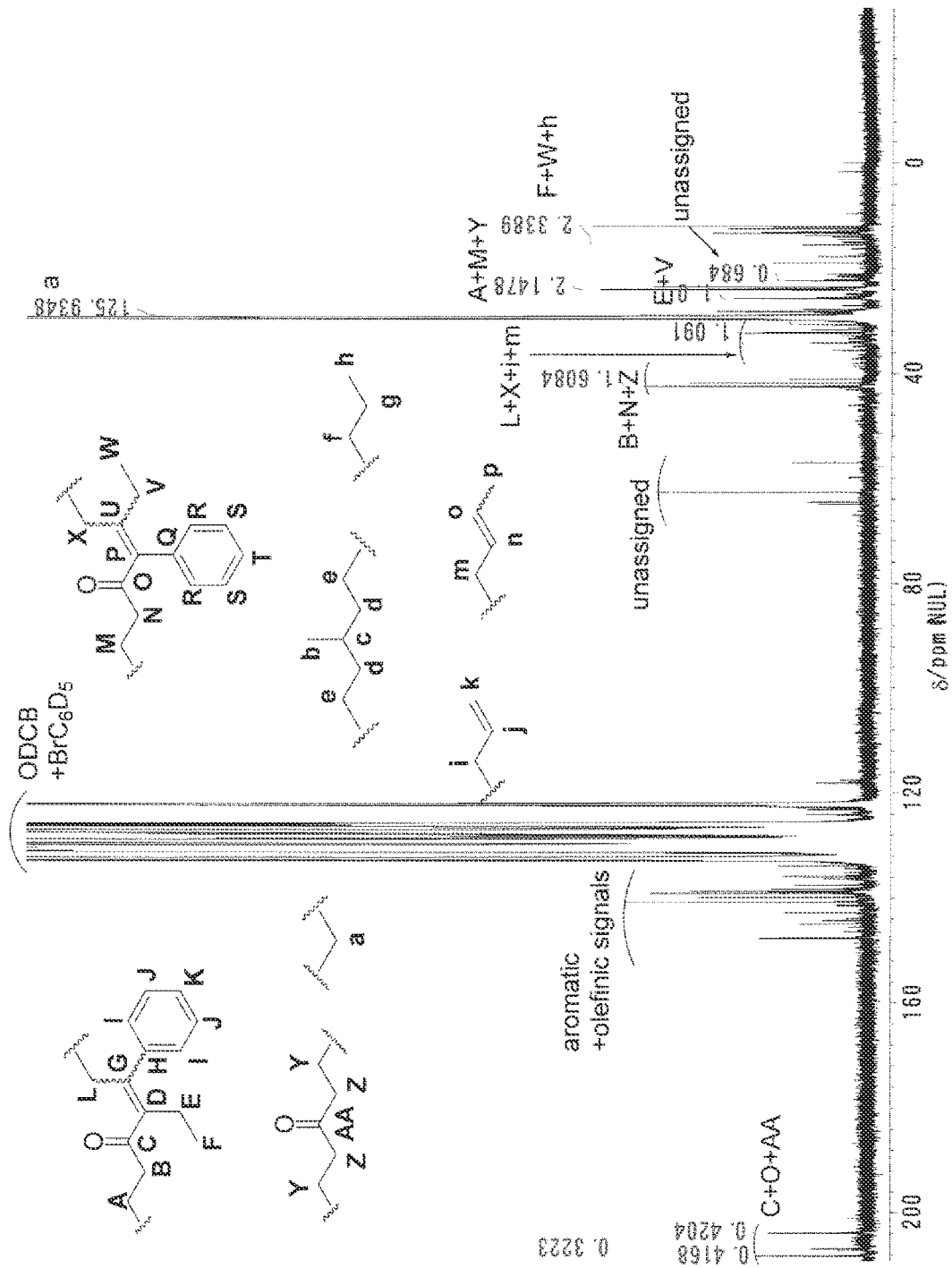
FIG. 10 shows the $^{13}$C-NMR measurement result of the polar group-containing olefin copolymer 13 of Example 13.

The results of various analyses of the polar group-containing olefin polymer 13 are shown in Table 2. FIG. 10 shows the $^{13}$C-NMR spectrum of the obtained polymer 13.

Example 14

In a nitrogen atmosphere, toluene (400 mL) as the solvent and 2-diethylamino-3-(4-methoxyphenyl)cyclopropen-1-one (578 mg, 2.5 mmol, containing about 10 mol % of 2-diethylamino-3-(2-methoxyphenyl)cyclopropen-1-one as impurity) as the monomer (B) were added in a 2.4 L autoclave in sequence. The autoclave was pressurized with ethylene (the monomer (A)) (3.0 MPa) and at a reaction temperature of 80° C., the transition metal complex (A) (278 mg, 0.40 mmol) as the catalyst was added. After the elapse of 10 minutes from the start of the reaction, 2-diethylamino-3-(4-methoxyphenyl)cyclopropen-1-one (578 mg, 2.5 mmol) was further added. After the elapse of 1 hour from the addition of the catalyst, a toluene solution of 1,2-butanediol (1 M, 10 mL) was added; the autoclave was returned to room temperature; and EKINEN (trade name) F-1 (500 mL) was added. A solid thus precipitated was recovered by filtration, washed with EKINEN (trade name) F-1 (500 mL×2), and then dried under reduced pressure. A polar group-containing olefin polymer 14 thus obtained was 9640 mg.

Figure 11:
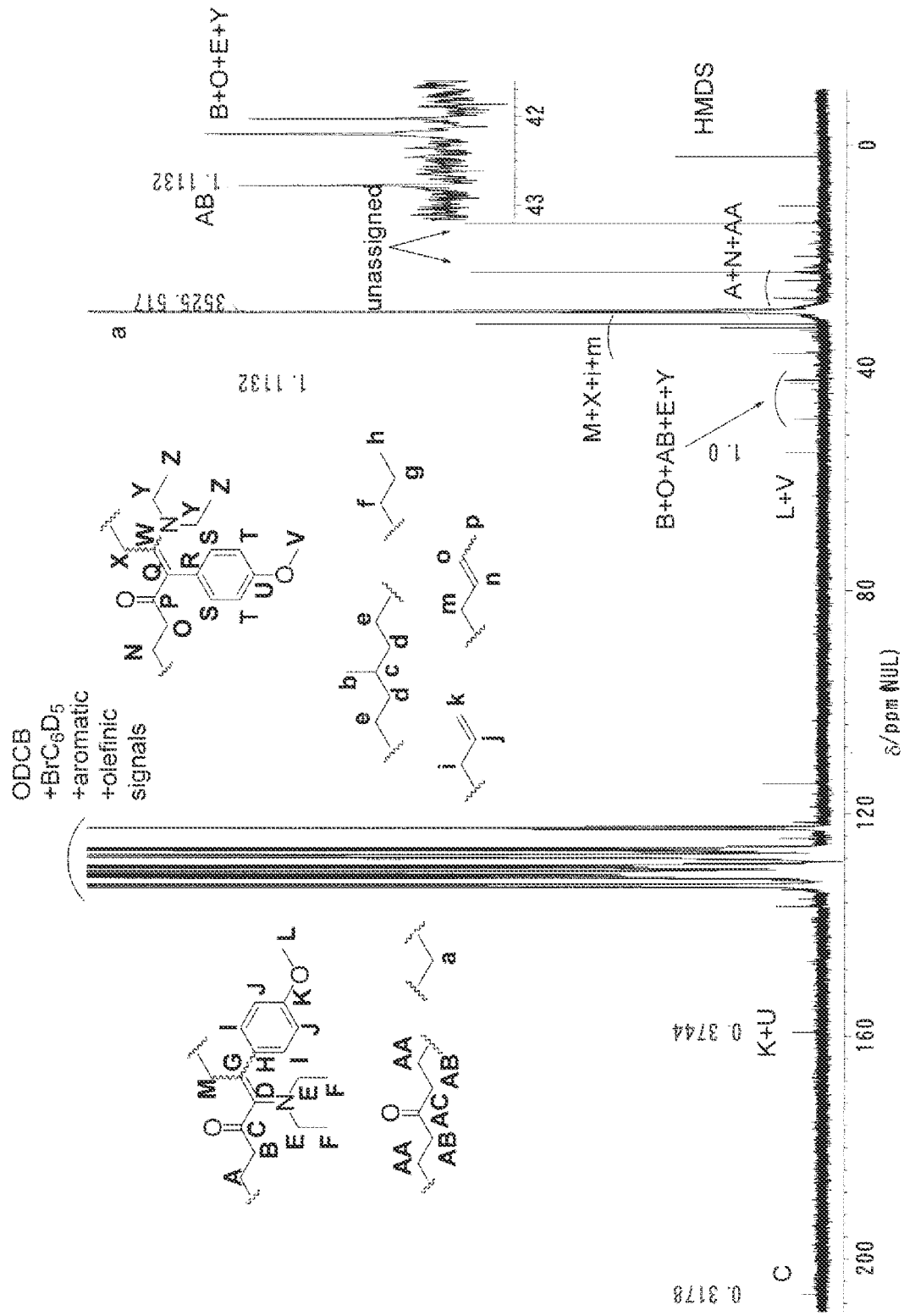
FIG. 11 shows the $^{13}$C-NMR measurement result of the polar group-containing olefin copolymer 14 of Example 14.

The results of various analyses of the polar group-containing olefin polymer 14 are shown in Table 2. FIG. 11 shows the $^{13}$C-NMR spectrum of the obtained polymer 14.

Example 15

In a nitrogen atmosphere, toluene (410 mL) as the solvent and 2-ethoxy-3-phenylcyclopropen-1-one (653 mg, 3.75 mmol) as the monomer (B) were added in a 2.4 L autoclave in sequence. The autoclave was pressurized with ethylene (the monomer (A)) (3.0 MPa) and at a reaction temperature of 80° C., the transition metal complex (A) (278 mg, 0.40 mmol) as the catalyst was added. After the elapse of 1 hour from the addition of the catalyst, a toluene solution of 1,2-butanediol (1 M, 10 mL) was added; the autoclave was returned to room temperature; and acetone (500 mL) was added. A solid thus precipitated was recovered by filtration, washed with acetone (500 mL×2), and then dried under reduced pressure. A polar group-containing olefin polymer 15 thus obtained was 5160 mg.

Figure 12:
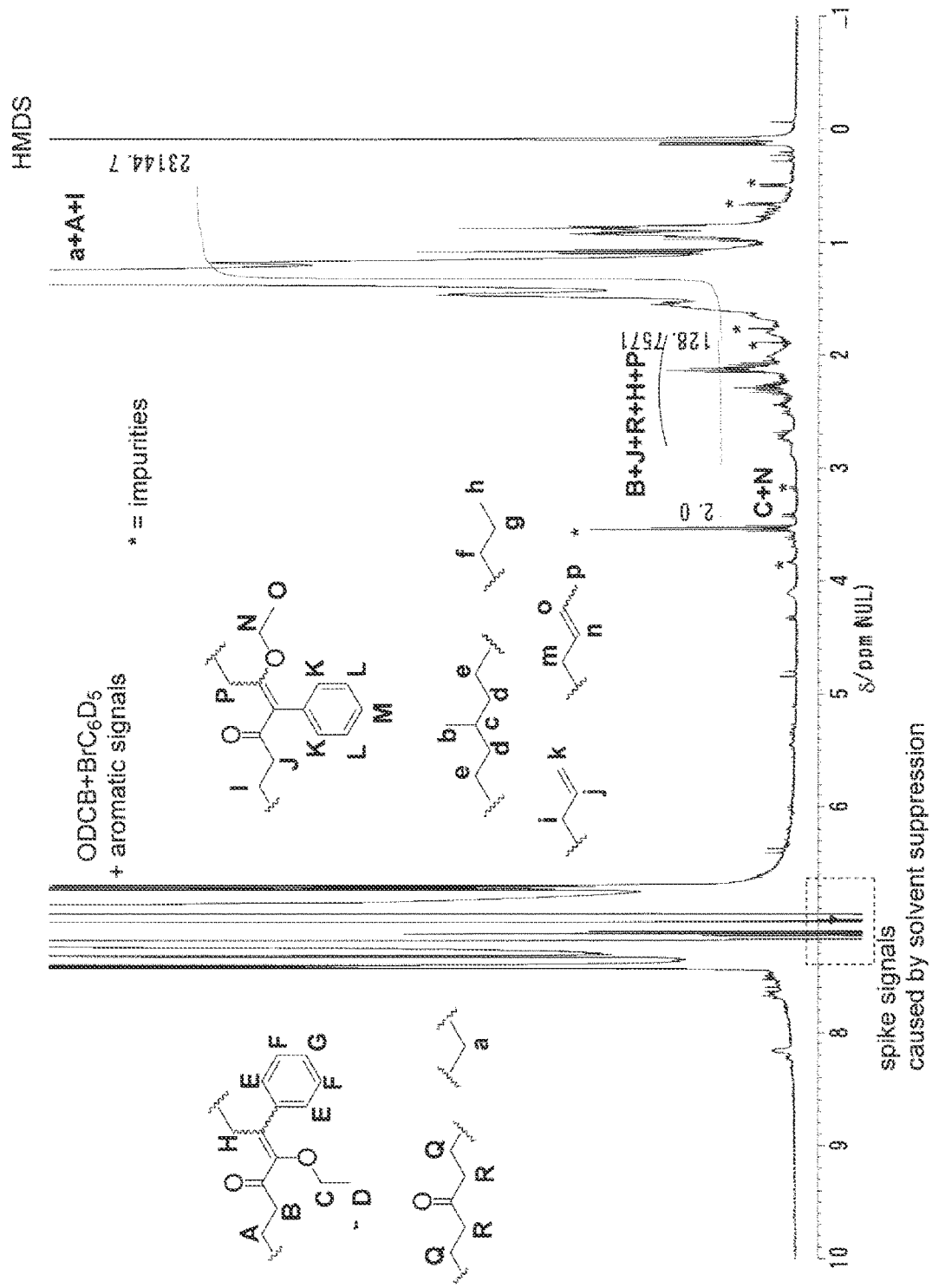
FIG. 12 shows the $^1$H-NMR measurement result of the polar group-containing olefin copolymer 15 of Example 15.
Figure 13:
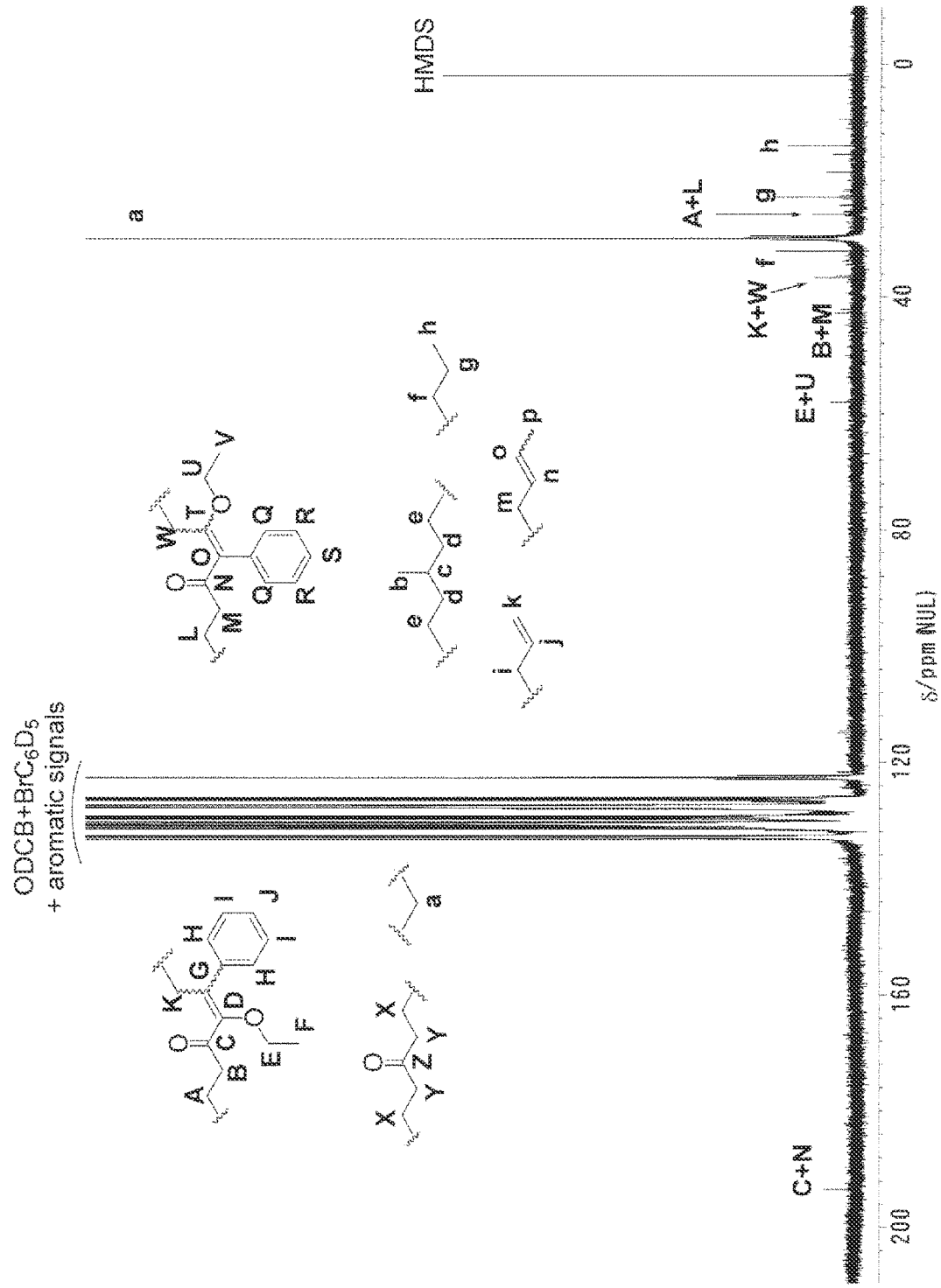
FIG. 13 shows the $^{13}$C-NMR measurement result of the polar group-containing olefin copolymer 15 of Example 15.
Figure 14:
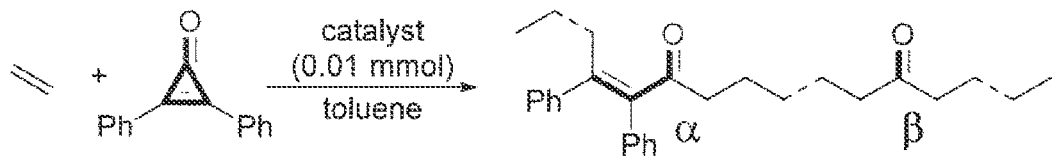
FIG. 14 shows the structures of α and β shown in FIG. 1.

The results of various analyses of the polar group-containing olefin polymer 15 are shown in Table 2. FIGS. 12 and 13 show the $^1$H-NMR spectrum and $^{13}$C-NMR spectrum of the polymer 15, respectively. The polymer 15 failed in peak separation in $^1$H-NMR and failed to quantitate the structure of β. Accordingly, "n.d." (not determined) is mentioned in Table 2.

TABLE 1

| Example | Catalyst type | Catalyst amount [mmol] | Temperature [° C.] | Time [h] | Monomer (A) Type | MPa | Monomer (B) Type | [mmol] | Monomer (C) Type | [mmol] |
|---|---|---|---|---|---|---|---|---|---|---|
| 1 | A | 0.01 | 80 | 12 | Ethylene | 3 | 2,3-Diphenylcyclopropen-1-one | 1 | — | — |
| 2 | B | 0.01 | 80 | 12 | Ethylene | 3 | 2,3-Diphenylcyclopropen-1-one | 1 | — | — |
| 3 | C | 0.01 | 80 | 12 | Ethylene | 3 | 2,3-Diphenylcyclopropen-1-one | 1 | — | — |
| 4 | D | 0.01 | 80 | 12 | Ethylene | 3 | 2,3-Diphenylcyclopropen-1-one | 1 | — | — |
| 5 | A | 0.01 | 60 | 12 | Ethylene | 3 | 2,3-Diphenylcyclopropen-1-one | 1 | — | — |
| 6 | A | 0.01 | 120 | 12 | Ethylene | 3 | 2,3-Diphenylcyclopropen-1-one | 1 | — | — |
| 7 | A | 0.01 | 80 | 12 | Ethylene | 1 | 2,3-Diphenylcyclopropen-1-one | 1 | — | — |
| 8 | A | 0.01 | 80 | 12 | Ethylene | 3 | 2,3-Diphenylcyclopropen-1-one | 5 | — | — |

TABLE 1-continued

| Example | Catalyst type | Catalyst amount [mmol] | Temperature [°C.] | Time [h] | Monomer (A) Type | MPa | Monomer (B) Type | [mmol] | Monomer (C) Type | [mmol] |
|---|---|---|---|---|---|---|---|---|---|---|
| 9 | A | 0.01 | 80 | 12 | Ethylene | 3 | 2,3-Di(4-methoxyphenyl)cyclo-propen-1-one | 1 | — | — |
| 10 | A | 0.01 | 80 | 12 | Ethylene | 3 | 2,3-Di(4-bromophenyl)cyclo-propen-1-one | 1 | — | — |
| 11 | A | 0.01 | 80 | 12 | Ethylene | 3 | 2,3-Diethylcyclopropen-1-one | 1 | — | — |
| 12 | A | 0.01 | 80 | 12 | Ethylene | 3 | 2,3-Diphenylcyclopropen-1-one | 1 | Allyl acetate | 18.5 |
| 13 | A | 0.40 | 80 | 1 | Ethylene | 3 | 3-Ethyl-2-phenylcyclopropen-1-one | 20 | — | — |
| 14 | A | 0.40 | 80 | 1 | Ethylene | 3 | 2-Diethylamino-3-(4-methoxyphenyl)cyclopropen-1-one | 5 | — | — |
| 15 | A | 0.40 | 80 | 1 | Ethylene | 3 | 2-Ethoxy-3-phenylcyclopropen-1-one | 3.75 | — | — |

TABLE 2

| Example | Polymer | Yield (g) | Catalytic activity (kg/mol/h) | Mn (g/mol) | Mw/Mn | Structural unit (B) (Structure of α) (mol %) | Structure of β (mol %) | Structural unit (A) (mol %) | Structural unit (C) (mol %) |
|---|---|---|---|---|---|---|---|---|---|
| 1 | 1 | 2.035 | 17.0 | 25,300 | 2.5 | 1.01 | 0.17 | 98.82 | — |
| 2 | 2 | 0.976 | 8.1 | 7,600 | 2.3 | 0.84 | 0.35 | 98.81 | — |
| 3 | 3 | 1.420 | 11.8 | 7,600 | 2.1 | 0.68 | 0.20 | 99.12 | — |
| 4 | 4 | 0.526 | 4.4 | 5,400 | 2.6 | 1.86 | 1.00 | 97.14 | — |
| 5 | 5 | 0.896 | 7.5 | 50,600 | 1.8 | 0.41 | 0.04 | 99.55 | — |
| 6 | 6 | 1.446 | 12.1 | 13,800 | 2.4 | 0.83 | 0.91 | 98.26 | — |
| 7 | 7 | 0.275 | 2.3 | 5,500 | 1.6 | 3.18 | 1.32 | 95.50 | — |
| 8 | 8 | 0.408 | 3.4 | 5,400 | 1.4 | 3.93 | 1.79 | 94.28 | — |
| 9 | 9 | 0.436 | 3.6 | 4,000 | 2.4 | 0.88※ | | 99.12 | — |
| 10 | 10 | 1.467 | 12.2 | 11,200 | 2.4 | 0.34 | 0.01 | 99.65 | — |
| 11 | 11 | 0.479 | 4.0 | 5,200 | 3.3 | 0.39 | <0.01 | 99.61 | — |
| 12 | 12 | 0.206 | 1.7 | 6,900 | 2.2 | 1.27 | 0.20 | 97.91 | 0.62 |
| 13 | 13 | 3.72 | 9.3 | 5,900 | 1.9 | 1.55 | 0.54 | 97.91 | — |
| 14 | 14 | 9.64 | 24.1 | 10,700 | 2.3 | 0.03 | 0.03 | 99.94 | — |
| 15 | 15 | 5.16 | 12.9 | 16,200 | 2.0 | 0.02 | n.d. | 99.98 | — |

※Total of α and β structures of Polymer 9
n.d. = not determined

As is clear from the NMR measurement results, the novel polar group-containing olefin copolymer in which, as the structural unit (B), an enone structure is introduced into the main chain, was obtained.

In Table 2, the structure of α (mol %) means the percentage of the contained structural unit (B) represented by the general formula (I) when the whole structural units of the polymer are defined as 100 mol %. The structure of a (mol %) means the percentage of the contained structural unit represented by the formula (II) when the whole structural units of the polymer are defined as 100 mol %.

INDUSTRIAL APPLICABILITY

In the novel polar group-containing olefin polymer of the present disclosure, as a structural unit, an enone structure is introduced into the main chain. Accordingly, the novel polar group-containing olefin polymer of the present disclosure can be used as a substrate for addition reaction, condensation reaction, etc., or as a polymerizable monomer, and it is expected to be a raw material that can be transformed into various composite materials. When the enone structure of the polar group-containing olefin polymer of the present disclosure contains a functional group, the functional group in the enone structure may function as a leaving group and may become the starting point for introducing a different substituent, and the enone structure may have chelate coordination properties with metals. Due to this function, the novel polar group-containing olefin polymer of the present disclosure is also expected to be usable as a carrier for metal complex catalysts, an absorbent for metal complex recovery, etc. Also, depending on the type of the functional group introduced into the enone structure, the novel polar group-containing olefin polymer of the present disclosure is applicable to pigments, dyes, medicines, etc.

The invention claimed is:

1. A polar group-containing olefin copolymer comprising a structural unit (A) derived from one or more monomers selected from the group consisting of ethylene and an olefin containing 3 to 20 carbon atoms, and a structural unit (B) represented by the following general formula (I):

General Formula (I)

where $R^x$ and $R^y$ are each independently a hydrogen atom, a halogen atom, a hydroxyl group, a formyl group, an ester group containing 1 to 30 carbon atoms, an acyloxy group containing 1 to 30 carbon atoms, an acyl group containing 1 to 30 carbon atoms, an alkoxy group containing 1 to 30 carbon atoms, an aryloxy group containing 6 to 30 carbon atoms, an alkylthio group containing 1 to 30 carbon atoms, an arylthio group containing 6 to 30 carbon atoms, a nitro group, an amino group optionally being substituted with a hydrocarbon group containing 1 to 30 carbon atoms, a silyl group optionally being substituted with a hydrocarbon group containing 1 to 30 carbon atoms, an amide group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring.

2. The polar group-containing olefin copolymer according to claim 1, wherein the structural unit (B) represented by the general formula (I) is derived from one or more monomers selected from the group consisting of polar group-containing monomers represented by the following general formula (1):

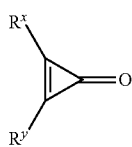

General Formula (1)

where $R^x$ and $R^y$ are each independently a hydrogen atom, a halogen atom, a hydroxyl group, a formyl group, an ester group containing 1 to 30 carbon atoms, an acyloxy group containing 1 to 30 carbon atoms, an acyl group containing 1 to 30 carbon atoms, an alkoxy group containing 1 to 30 carbon atoms, an aryloxy group containing 6 to 30 carbon atoms, an alkylthio group containing 1 to 30 carbon atoms, an arylthio group containing 6 to 30 carbon atoms, a nitro group, an amino group optionally being substituted with a hydrocarbon group containing 1 to 30 carbon atoms, a silyl group optionally being substituted with a hydrocarbon group containing 1 to 30 carbon atoms, an amide group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring.

3. The polar group-containing olefin copolymer according to claim 1, wherein at least one of $R^x$ and $R^y$ is different from a hydrogen atom.

4. The polar group-containing olefin copolymer according to claim 1, further comprising a structural unit (C) derived from one or more monomers selected from the group consisting of a polar group-containing monomer (c-1) represented by the following general formula (2) and a polar group-containing monomer (c-2) represented by the following general formula (3):

General Formula (2)

where $R^1$ and $R^2$ are each independently a hydrogen atom, an ester group containing 1 to 30 carbon atoms, an acyloxy group containing 1 to 30 carbon atoms, an alkoxy group containing 1 to 30 carbon atoms, an aryloxy group containing 6 to 30 carbon atoms, a cyano group, an amino group optionally being substituted with a hydrocarbon group containing 1 to 30 carbon atoms, an amide group optionally being substituted with a hydrocarbon group containing 1 to 30 carbon atoms, an imino group optionally being substituted with a hydrocarbon group containing 1 to 30 carbon atoms, a halogen-substituted hydrocarbon group containing 1 to 30 carbon atoms, or a hydrocarbon group containing 1 to 30 carbon atoms and optionally being substituted with a functional group containing at least one selected from the group consisting of an oxygen atom, a sulfur atom, a nitrogen atom and a phosphorus atom, and at least one of $R^1$ and $R^2$ is a group containing at least one of an oxygen atom and a nitrogen atom, and

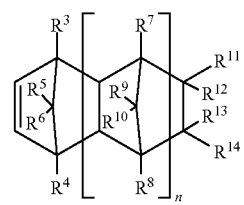

General Formula (3)

where $R^3$ to $R^{10}$ are each independently a hydrogen atom, a halogen atom or a hydrocarbon group containing 1 to 20 carbon atoms; n is 0 or a positive integer, and when n is 2 or more, $R^7$ to $R^{10}$ are each optionally the same or different in each repeating unit; $R^{11}$ to $R^{14}$ are each independently a hydrogen atom, an ester group containing 1 to 30 carbon atoms, an acyloxy group containing 1 to 30 carbon atoms, an alkoxy group containing 1 to 30 carbon atoms, an aryloxy group containing 6 to 30 carbon atoms, a cyano group, an amino group optionally being substituted with a hydrocarbon group containing 1 to 30 carbon atoms, an amide group optionally being substituted with a hydrocarbon group containing 1 to 30 carbon atoms, an imino group optionally being substituted with a hydrocarbon group containing 1 to 30 carbon atoms, or a hydrocarbon group containing 1 to 30 carbon atoms and optionally being substituted with a functional group containing at least one selected from the group consisting of an oxygen atom, a sulfur atom, a nitrogen atom and a phosphorus atom, and at least one of $R^{11}$ to $R^{14}$ is a group containing at least one of an oxygen atom and a nitrogen atom; and $R^{11}$ and $R^{12}$ are optionally integrated to form a divalent organic group, and $R^{13}$ and $R^{14}$ are optionally integrated to form a divalent organic group; $R^{11}$ or $R^{12}$ optionally forms a ring with $R^{13}$ or $R^{14}$.

5. The polar group-containing olefin copolymer according to claim 1, wherein the structural unit (A) is a structural unit derived from ethylene.

6. The polar group-containing olefin copolymer according to claim 1, wherein $R^x$ and $R^y$ are each independently a hydrogen atom, a hydroxyl group, a formyl group, an ester group containing 1 to 30 carbon atoms, an acyl group containing 1 to 30 carbon atoms, an alkoxy group containing 1 to 30 carbon atoms, an amino group optionally being substituted with a hydrocarbon group containing 1 to 30 carbon atoms, a silyl group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring, and wherein at least one of $R^x$ and $R^y$ is different from a hydrogen atom.

7. The polar group-containing olefin copolymer according to claim 1, wherein $R^x$ and $R^y$ are each independently a halogen atom, a hydroxyl group, a formyl group, an ester group containing 1 to 30 carbon atoms, an acyloxy group containing 1 to 30 carbon atoms, an acyl group containing 1 to 30 carbon atoms, an alkoxy group containing 1 to 30 carbon atoms, an aryloxy group containing 6 to 30 carbon atoms, an alkylthio group containing 1 to 30 carbon atoms, an arylthio group containing 6 to 30 carbon atoms, an amino group optionally being substituted with a hydrocarbon group containing 1 to 30 carbon atoms, a silyl group optionally being substituted with a hydrocarbon group containing 1 to 30 carbon atoms, an amide group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring.

8. The polar group-containing olefin copolymer according to claim 1, wherein $R^x$ and $R^y$ are each independently a hydroxyl group, a formyl group, an ester group containing 1 to 30 carbon atoms, an acyl group containing 1 to 30 carbon atoms, an alkoxy group containing 1 to 30 carbon atoms, an amino group optionally being substituted with a hydrocarbon group containing 1 to 30 carbon atoms, a silyl group optionally being substituted with a hydrocarbon group containing 1 to 30 carbon atoms, a halogen-substituted hydrocarbon group containing 1 to 30 carbon atoms, a hydrocarbon group containing 1 to 30 carbon atoms and optionally being substituted with a functional group containing at least one selected from the group consisting of an oxygen atom, a sulfur atom and a nitrogen atom, or a heterocyclic group optionally being substituted with a functional group containing at least one selected from the group consisting of an oxygen atom, a sulfur atom and a nitrogen atom, or $R^x$ and $R^y$ are optionally bound to each other to form a 4- to 10-membered ring.

* * * * *